US009124895B2

(12) United States Patent
Wang

(10) Patent No.: US 9,124,895 B2
(45) Date of Patent: Sep. 1, 2015

(54) VIDEO CODING WITH NETWORK ABSTRACTION LAYER UNITS THAT INCLUDE MULTIPLE ENCODED PICTURE PARTITIONS

(71) Applicant: Qualcomm Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/666,442

(22) Filed: Nov. 1, 2012

(65) Prior Publication Data
US 2013/0114735 A1   May 9, 2013
Related U.S. Application Data

(60) Provisional application No. 61/555,932, filed on Nov. 4, 2011, provisional application No. 61/557,259, filed on Nov. 8, 2011.

(51) Int. Cl.
*H04N 7/26* (2006.01)
*H03M 7/00* (2006.01)
*H03M 7/34* (2006.01)
(Continued)

(52) U.S. Cl.
CPC ............ *H04N 19/436* (2014.11); *H04N 19/13* (2014.11); *H04N 19/17* (2014.11); *H04N 19/174* (2014.11); *H04N 19/176* (2014.11)

(58) Field of Classification Search
CPC ................................ H03M 7/40; H04N 7/263
USPC ................ 345/552, 501; 375/240.24, 240.01, 375/E7.026, E7.081; 341/58, 67; 382/233, 382/250
See application file for complete search history.

(56) References Cited

U.S. PATENT DOCUMENTS 5,471,248 A * 11/1995 Bhargava et al. ........ 375/240.24
5,532,744 A    7/1996 Akiwumi-Assani et al.
(Continued)

FOREIGN PATENT DOCUMENTS

EP      2216994 A2    8/2010
JP   2006319943 A   11/2006
(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
(Continued)

*Primary Examiner* — Geepy Pe
*Assistant Examiner* — Patricia I Young
(74) *Attorney, Agent, or Firm* — Shumaker & Sieffert, P.A.

(57) ABSTRACT

A video encoder generates a Network Abstraction Layer (NAL) unit that contains a plurality of encoded picture partitions of the video data. The video encoder generates a bitstream that includes a variable-length value that represents an entropy-encoded first syntax element, a variable-length value that represents an entropy-encoded second syntax element, and fixed-length values that represent offset syntax elements. Lengths of each of the offset syntax elements are determinable based on the first syntax element. A video decoder uses the first syntax element, the second syntax element, and the offset syntax elements when decoding the encoded picture partitions.

34 Claims, 12 Drawing Sheets

(51) Int. Cl.
| | |
|---|---|
| H04N 19/436 | (2014.01) |
| H04N 19/176 | (2014.01) |
| H04N 19/13 | (2014.01) |
| H04N 19/174 | (2014.01) |
| H04N 19/17 | (2014.01) |

(56) References Cited

U.S. PATENT DOCUMENTS

| | | | |
|---|---|---|---|
| 5,557,332 | A | 9/1996 | Koyanagi et al. |
| 6,919,826 | B1 * | 7/2005 | Peacock ........................... 341/51 |
| 7,375,661 | B2 | 5/2008 | Chiba et al. |
| 7,595,743 | B1 | 9/2009 | Winger et al. |
| 7,782,943 | B2 | 8/2010 | Jeon et al. |
| 2006/0233525 | A1 | 10/2006 | Shibata et al. |
| 2007/0177672 | A1 | 8/2007 | Yang |
| 2008/0013620 | A1 | 1/2008 | Hannuksela et al. |
| 2008/0013622 | A1 | 1/2008 | Bao et al. |
| 2008/0253461 | A1 | 10/2008 | Lin et al. |
| 2009/0002379 | A1 | 1/2009 | Baeza et al. |
| 2009/0245349 | A1 | 10/2009 | Zhao et al. |
| 2009/0245661 | A1 | 10/2009 | Ilbery |
| 2010/0046635 | A1 | 2/2010 | Pandit et al. |
| 2010/0098157 | A1 | 4/2010 | Yang |
| 2010/0111183 | A1 | 5/2010 | Jeon et al. |
| 2011/0055661 | A1 | 3/2011 | Grube et al. |
| 2011/0110436 | A1 | 5/2011 | Schierl et al. |
| 2012/0075436 | A1 | 3/2012 | Chen et al. |
| 2012/0082218 | A1 | 4/2012 | Misra et al. |
| 2012/0163452 | A1 | 6/2012 | Horowitz |
| 2012/0166582 | A1 | 6/2012 | Binder |
| 2012/0189049 | A1 | 7/2012 | Coban et al. |
| 2012/0230428 | A1 | 9/2012 | Segall et al. |
| 2013/0114736 | A1 | 5/2013 | Wang et al. |

FOREIGN PATENT DOCUMENTS

| | | | |
|---|---|---|---|
| WO | 2009119888 | A1 | 10/2009 |
| WO | 2010030752 | A2 | 3/2010 |
| WO | 2010050157 | A1 | 5/2010 |
| WO | 2011048303 | A1 | 4/2011 |

OTHER PUBLICATIONS

International Preliminary Report on Patentability—PCT/US2012/063265—The International Bureau of WIPO Geneva Switzerland Feb. 26, 2014, 13 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Second Written Opinion from International Application No. PCT/US2012/063265, dated Dec. 4, 2013, 11 pp.
Anonymous, "Test Model under Consideration", Joint Collaborative Team on Video Coding, JCTVC-B205, Jul. 21-28, 2010, 152 pp.
Bross et al., "WD4: Working Draft 4 of High-Efficiency Video Coding," JCTVC-F803_d0, Joint Collaborative Team on Video Coding, Jul. 14-22, 2011, 216 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," JCTVC-F803_d1, Joint Collaborative Team on Video Coding, Jul. 14-22, 2011, 222 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Chen et al.,"Unified NAL unit header design for HEVC and its extensions", Joint Collaborative Team on Video Coding, JCTVC-G336, Nov. 21-30, 2011, 8 pp.
Clare et al., "Wavefront and Cabac Flush: Different Degrees of Parallelism Without Transcoding," Joint Collaborative Team on Video Coding, JCTVC-F275 PowerPoint, Jul. 14-22, 2011, 12 slides.
Clare, et al., "Wavefront and Cabac Flush: Different Degrees of Parallelism Without Transcoding," Joint Collaborative Team on Video Coding, JCTVC-F275, Jul. 14-22, 2011, 11 pp.
Clare, et al., "Wavefront Parallel Processing for HEVC Encoding and Decoding," Joint Collaborative Team on Video Coding, JCTVC-F274, Jul. 14-22, 2011, 16 pp.
Clare et al., "Wavefront Parallel Processing for HEVC Encoding and Decoding," Joint Collaborative Team on Video Coding, JCTVC-F274 PowerPoint, Jul. 14-22, 2011, 18 slides.
Coban M. et al., "Unification of picture partitioning schemes", Joint Collaborative Team on Video Coding, JCTVC-G315, Nov. 21-30, 2011, 11 pp.
Coban et al., "Evaluation of Entropy Slices", Joint Collaborative Team on Video Coding, JCTVC-D430, Jan. 20-28, 2011, 3 pp.
Fuldseth, "Replacing Slices with tiles for high level parallelism", Joint Collaborative Team on Video Coding, JCTVC-D227, Jan. 20-28, 2011, 4 pp.
Fuldseth et al., "Tiles," Joint Collaborative Team on Video Coding, JCTVC-F335, Jul. 14-22, 2011, 15 pp.
Fuldseth et al., "Tiles," Joint Collaborative Team on Video Coding, JCTVC-F335 PowerPoint, Jul. 14-22, 2011, 12 slides.
Hang et al., "Towards the Next Video Standard: High Efficiency Video Coding," Proceedings of the Second APSIPA Annual Summit and Conference, Dec. 14-17, 2010, 10 pp.
Horowitz "JCT-VC BoG report: tiles and wavefront parallel processing" Joint Collaborative Team on Video Coding, JCTVC-G1025, Nov. 21-30, 2011, 8 pp.
Horowitz et al.,"Generalized slices", Joint Collaborative Team on Video Coding, JCTVC-D378, Jan. 20-28, 2011, 7 pp.
Hsu et al., "Syntax for Leaf Coding Unit Aligned Slices", Joint Collaborative Team on Video Coding, JCTVC-D127, Jan. 20-28, 2011, 13 pp.
International Search Report and Written Opinion—PCT/US2012/063265—ISA/EPO—Jan. 31, 2013—16 pp.
International Telecommunication Union, "Advanced video coding for generic audiovisual services," Standardization Sector of ITU, Jun. 2011, 674 pp.
Misra et al.,"Lightweight slicing for entropy coding", Joint Collaborative Team on Video Coding, JCTVC-D070, Jan. 20-28, 2011, 7 pp.
Lambert et al., "Flexible macroblock ordering in H.264/AVC", Journal of Visual Communication and Image Representation, Academic Press, Apr. 2006, 18 pp.
McCann, "HM4: High Efficiency Video Coding (HEVC) Test Model 4 Encoder Description", Joint Collaborative Team on Video Coding, JCTVC-F802, Jul. 14-22, 2011, 36 pp.
Misra, et al., "New results for parallel decoding for Tiles," Joint Collaborative Team on Video Coding, JCTVC-F594, Jul. 14-22, 2011, 6 pp.
Misra et al., "New results for parallel decoding for Tiles," Joint Collaborative Team on Video Coding, JCTVC-F594 PowerPoint, Jul. 14-22, 2011, 10 slides.
Misra et al., "Entropy Slices for Parallel Entropy Coding", Joint Collaborative Team on Video Coding, JCTVC-B111 PowerPoint, Jul. 21-28, 2010, 10 slides.
Misra et al., "Entropy Slices for Parallel Entropy Coding", Joint Collaborative Team on Video Coding, JCTVC-B111, Jul. 21-28, 2010, 6 pp.

(56) References Cited

OTHER PUBLICATIONS

Misra et al., "Entropy Slices for Parallel Entropy Coding", Joint Collaborative Team on Video Coding, JCTVC-C256, Oct. 7-15, 2010, 6 pp.

Nael et al.,"Slices modifications for HEVC", Joint Collaborative Team on Video Coding, JCTVC-E222, Mar. 16-23, 2011, 8 pp.

Stockhammer et al., "Comments on H.26L NAL design", ITU—Telecommunications Standarization Sector, VCEG-L26, Jan. 9-12, 2001, 4 pp.

Wang et al., "Flexible tile dependency and loop filtering control", Joint Collaborative Team on Video Coding, JCTVC-G0520, Feb. 1-10, 2012, 7 pp.

Wang et al., "Flexible tile dependency and loop filter control", Joint Collaborative Team on Video Coding, JCTVC-H0521_r1, Feb. 1-10, 2012, 7 pp.

Wenger et al., "Adaptation Parameter Set (APS)," Joint Collaborative Team on Video Coding, JCTVC-F747r3, Jul. 14-22, 2011, 10 pp.

Wenger et al., "High level syntax for loop filter parameters," Joint Collaborative Team on Video Coding, JCTVC-F747 PowerPoint, Jul. 14-22, 2011, 7 slides.

Wiegand et al., "Overview of the H.264/AVC Video Coding Standard", IEEE Transactions on Circuits and Systems for Video Technology, vol. 13, No. 7, Jul. 2003, 17 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

First Office Action from counterpart Japanese Application No. 2014-540122, dated Jun. 9, 2015, 9 pp.

Notice of Grounds for Rejection from counterpart Korean Application No. 2014-7014849, dated Jun. 4, 2015, 11 pp.

Bross et al., "WD4: Working Draft 4 of High-Efficiency Video Coding," 6th Meeting: JCTVC-F803_d6, Torino, IT, Jul. 14-22, 2011, 25 pp.

Bross et al., "WD4: Working Draft 4 of High-Efficiency Video Coding," 6th Meeting: JCTVC-F803_d6, Torino, IT, Jul. 14-22, 2011, 229 pp.

\* cited by examiner

US 9,124,895 B2

VIDEO CODING WITH NETWORK ABSTRACTION LAYER UNITS THAT INCLUDE MULTIPLE ENCODED PICTURE PARTITIONS

This application claims the benefit of U.S. Provisional Patent Application No. 61/555,932, filed Nov. 4, 2011, and U.S. Provisional Patent Application No. 61/557,259, filed Nov. 8, 2011, the entire content of both of which are hereby incorporated by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, a video encoder generates a bitstream that includes a variable-length value that represents an entropy-encoded first syntax element, a variable-length value that represents an entropy-encoded second syntax element, and fixed-length values that represent offset syntax elements. Lengths of each of the offset syntax elements are determinable based on the first syntax element. The number of offset syntax elements in the series of offset syntax elements is determinable based on the second syntax element. Locations of a plurality of encoded picture partitions within a network abstraction layer (NAL) unit are determinable based on the offset syntax elements. A video decoder receives the bitstream, entropy decodes the first and second syntax elements, and uses the first and second syntax elements to parse the offset syntax elements. The video decoder uses the offset syntax elements to determine the locations within the NAL unit of the encoded picture partitions. The video decoder decodes the encoded picture partitions.

In one aspect, this disclosure describes a method comprising entropy encoding a first syntax element, a second syntax element, and a series of offset syntax elements. Lengths of each of the offset syntax elements are determinable based on the first syntax element. The number of offset syntax elements in the series of offset syntax elements is determinable based on the second syntax element. Locations of a plurality of encoded picture partitions within a NAL unit are determinable based on the offset syntax elements. The method also comprises generating a bitstream that includes a variable-length value that represents the entropy-encoded first syntax element, a variable-length value that represents the entropy-encoded second syntax element, and fixed-length values that represent the offset syntax elements.

In another aspect, this disclosure describes a computing device that comprises one or more processors configured to entropy encode a first syntax element, a second syntax element, and a series of offset syntax elements. Lengths of each of the offset syntax elements are determinable based on the first syntax element. The number of offset syntax elements in the series of offset syntax elements is determinable based on the second syntax element. Locations of a plurality of encoded picture partitions within a NAL unit are determinable based on the offset syntax elements. The one or more processors are also configured to generate a bitstream that includes a variable-length value that represents the entropy-encoded first syntax element, a variable-length value that represents the entropy-encoded second syntax element, and fixed-length values that represent the offset syntax elements.

In another aspect, this disclosure describes a computing device that comprises means for entropy encoding a first syntax element, a second syntax element, and a series of offset syntax elements. Lengths of each of the offset syntax elements are determinable based on the first syntax element. The number of offset syntax elements in the series of offset syntax elements is determinable based on the second syntax element. Locations of a plurality of encoded picture partitions within a NAL unit are determinable based on the offset syntax elements. The computing device also comprises means for generating a bitstream that includes a variable-length value that represents the entropy-encoded first syntax element, a variable-length value that represents the entropy-encoded second syntax element, and fixed-length values that represent the offset syntax elements.

In another aspect, this disclosure describes a computer-readable storage medium that stores instructions that, when executed by one or more processors of a computing device, configure the computing device to entropy encode a first syntax element, a second syntax element, and a series of offset syntax elements. Lengths of each of the offset syntax elements are determinable based on the first syntax element. The number of offset syntax elements in the series of offset syntax elements is determinable based on the second syntax element. Locations of a plurality of encoded picture partitions within a NAL unit are determinable based on the offset syntax elements. In addition, the instructions configure the computing device to generate a bitstream that includes a variable-length value that represents the entropy-encoded first syntax element, a variable-length value that represents the entropy-encoded second syntax element, and fixed-length values that represent the offset syntax elements.

In another aspect, this disclosure describes a method for decoding video data. The method comprises receiving a bitstream that includes an entropy-encoded variable-length value that represents a first syntax element, an entropy-encoded variable-length value that represents a second syntax element, and a series of offset syntax elements. The method also comprises entropy decoding the first syntax element and the second syntax element. Furthermore, the method comprises determining, based on the first syntax element, lengths of each of the offset syntax elements. The method also comprises determining, based on the second syntax element, the number of offset syntax elements in the series of offset syntax elements. In addition, the method comprises parsing, based at least in part on the lengths of each of the offset syntax elements and the number of offset syntax elements in the series of offset syntax elements, the offset syntax elements. Furthermore, the method comprises determining, based on the offset syntax elements, locations of a plurality of encoded picture partitions within a NAL unit. The method also comprises decoding the encoded picture partitions.

In another aspect, this disclosure describes a computing device that comprises one or more processors configured to receive a bitstream that includes an entropy-encoded variable-length value that represents a first syntax element, an entropy-encoded variable-length value that represents a second syntax element, and a series of offset syntax elements. The one or more processors are also configured to entropy decode the first syntax element and the second syntax element. The one or more processors are also configured to determine, based on the first syntax element, lengths of each of the offset syntax elements. In addition, the one or more processors are configured to determine, based on the second syntax element, the number of offset syntax elements in the series of offset syntax elements. The one or more processors are also configured to parse, based at least in part on the lengths of each of the offset syntax elements and the number of offset syntax elements in the series of offset syntax elements, the offset syntax elements. Furthermore, the one or more processors are configured to determine, based on the offset syntax elements, locations of a plurality of encoded picture partitions within a NAL unit. The one or more processors are also configured to decode the encoded picture partitions.

In another aspect, this disclosure describes a computing device that comprises means for receiving a bitstream that includes an entropy-encoded variable-length value that represents a first syntax element, an entropy-encoded variable-length value that represents a second syntax element, and a series of offset syntax elements. The computing device also comprises means for entropy decoding the first syntax element and the second syntax element. In addition, the computing device comprises means for determining, based on the first syntax element, lengths of each of the offset syntax elements. The computing device also comprises means for determining, based on the second syntax element, the number of offset syntax elements in the series of offset syntax elements. Furthermore, the computing device comprises means for parsing, based at least in part on the lengths of each of the offset syntax elements and the number of offset syntax elements in the series of offset syntax elements, the offset syntax elements. In addition, the computing device comprises means for determining, based on the offset syntax elements, locations of a plurality of encoded picture partitions within a NAL unit. The computing device also comprises means for decoding the encoded picture partitions.

In another aspect, this disclosure describes a computer-readable storage medium that stores instructions that, when executed by one or more processors of a computing device, configure the computing device to receive a bitstream that includes an entropy-encoded variable-length value that represents a first syntax element, an entropy-encoded variable-length value that represents a second syntax element, and a series of offset syntax elements. Furthermore, the instructions cause the computing device to entropy decode the first syntax element and the second syntax element. The instructions also cause the computing device to determine, based on the first syntax element, lengths of each of the offset syntax elements. In addition, the instructions cause the computing device to determine, based on the second syntax element, the number of offset syntax elements in the series of offset syntax elements. In addition, the instructions cause the computing device to parse, based at least in part on the lengths of each of the offset syntax elements and the number of offset syntax elements in the series of offset syntax elements, the offset syntax elements. The instructions also cause the computing device to determining, based on the offset syntax elements, locations of a plurality of encoded picture partitions within a NAL unit. In addition, the instructions cause the computing device to decode the encoded picture partitions.

The details of one or more examples of the disclosure are set forth in the accompanying drawings and the description below. Other features, objects, and advantages will be apparent from the description, drawings, and claims.

DETAILED DESCRIPTION

Figure 1:
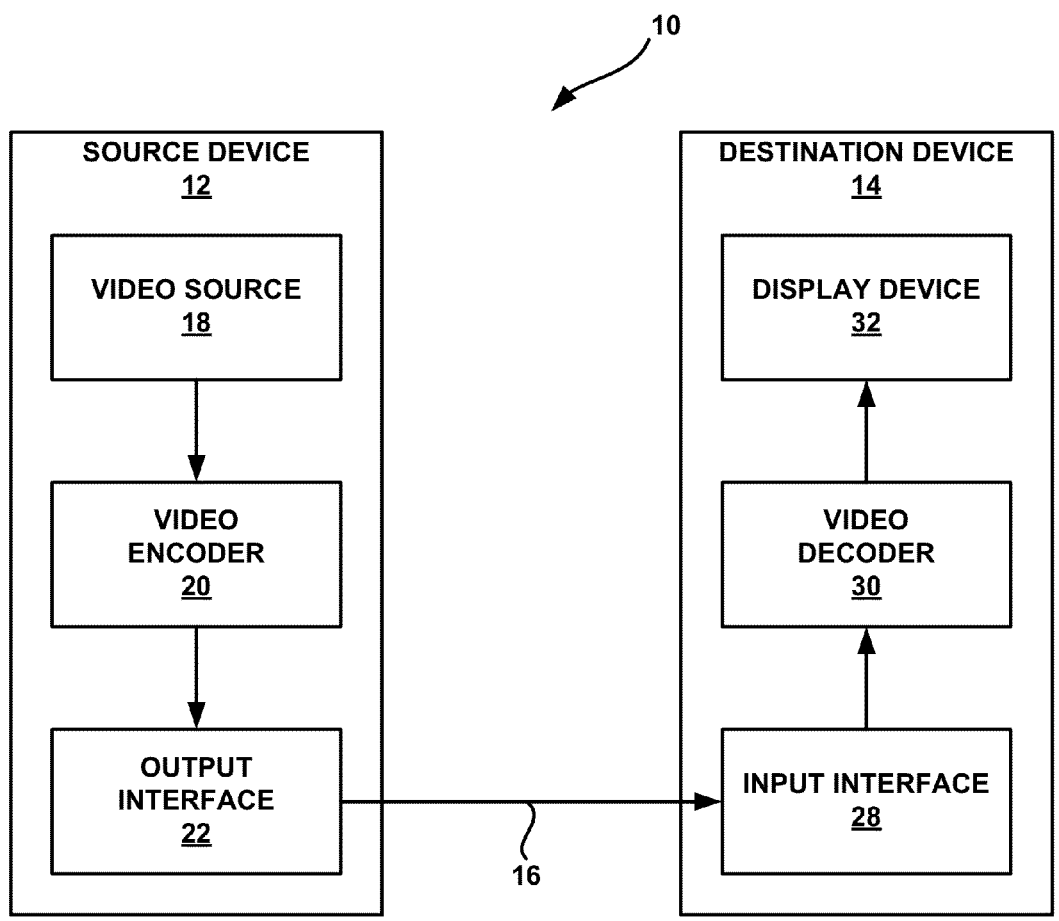
FIG. 1 is a block diagram illustrating an example video coding system that may utilize the techniques described in this disclosure.

A picture includes a plurality of tree blocks. The tree blocks are associated with two-dimensional pixel blocks within the picture. A video encoder divides the picture into a plurality of picture partitions. For example, the video encoder may divide the picture into entropy slices, tiles, or wavefront parallel processing (WPP) waves. In other words, this disclosure may use the term "picture partition" to refer generically to entropy slices, tiles, or WPP waves. The picture partitions are associated with non-overlapping subsets of the tree blocks of the picture. For instance, each tree block of the picture may be associated with exactly one of the picture partitions. A video encoder may generate a coded slice Network Abstraction Layer (NAL) unit that includes one or more encoded picture partitions associated with a slice.

In some examples, a video decoder may decode encoded picture partitions of a slice in parallel. In order to decode the encoded picture partitions of a slice in parallel, the video encoder may signal, within a coded slice NAL unit, the entry points of the encoded picture partitions. An entry point of an encoded picture partition may be the position of a first bit of the encoded picture partition. Because the video decoder is able to determine the entry points of the encoded picture partitions, the video decoder may be able to assign different encoded picture partitions to different processing cores of a decoder for parallel decoding.

To signal the entry points of tiles, the video encoder may generate a series of offset syntax elements. Each of the offset syntax elements may indicate the number of bytes in a tile. In addition, the video encoder may generate two additional syntax elements. The number of tiles in a slice may be determined based on the first additional syntax element. The number of bits used in each of the offset syntax elements may be determined based on the second additional syntax element. In existing implementations, each of the additional syntax elements is always represented in the bitstream using a 5-bit unsigned integer.

Always representing the additional syntax elements as 5-bit unsigned integers may unnecessarily increase the number of bits in the bitstream. Furthermore, always representing the additional syntax elements as 5-bit unsigned integers may limit the number of offset syntax elements to 32. In accordance with one or more techniques of this disclosure, a video encoder may entropy encode (e.g., use ue(v), unsigned integer 0-th order Exp-Golomb-coded syntax element with the left bit first) the additional syntax elements. Because the video encoder entropy encodes the additional syntax elements, the additional syntax elements are represented in the bitstream using variable-length sequences of bits. In many cases, these variable-length sequences of bits can represent the additional syntax elements using fewer bits than 5-bit unsigned integers. In addition, entropy coding of these additional syntax elements may allow the video encoder to signal more than 32 offset syntax elements.

In some instances, a particular video decoder may not be configured to decode encoded picture partitions in parallel. That is, some video decoders may have different capabilities in terms of parallel processing. In such instances, the bits used to signal the entry points of the encoded picture partitions are not useful to the video decoder.

In accordance with the techniques of this disclosure, a video encoder may generate a VCL NAL unit that contains a plurality of encoded picture partitions of the video data. In addition, the video encoder may generate a Supplemental Enhancement Information (SEI) message that indicates entry points of the encoded picture partitions within the NAL unit. For ease of explanation, this disclosure may refer to an SEI message that indicates entry points of encoded picture partitions in a coded slice NAL unit as an "entry point SEI message." The entry point SEI message may be provided, for example, in a non-VCL NAL unit, such as a non-VCL NAL unit having an SEI type.

Media-aware network elements (MANEs) may be configured with data that indicate the configurations of particular video decoders. Based on such data, a MANE may be configured to transmit an entry point SEI message to a video decoder only if the video decoder is configured to decode encoded picture partitions in parallel. Because the MANE does not transmit data that the video decoder is not configured to use, bandwidth may be conserved. Furthermore, because the entry points are signaled in SEI messages, there may be no need to signal in a coded slice NAL unit whether or not the coded slice NAL unit includes data that indicate positions of coded picture partitions. This help to reduce the number of bits in the coded slice NAL unit and thereby further conserve bandwidth.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise a type of medium or device capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include to a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously captured video data, a video feed interface to receive video data from a video content provider, and/or a computer graphics system for generating video data, or a combination of such sources of video data.

Video encoder 20 may encode video data from video source 18. In some examples, source device 12 may directly transmit the encoded video data to destination device 14 via output interface 22. The encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 may include a receiver and/or a modem. Input interface 28 of destination device 14 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 4" or "WD4," is described in Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, Italy, July, 2011, which, as of Sep. 27, 2012, is downloadable from: http://phenix.int-evry.fr/jct/doc_end_user/documents/6_Torino/wg11/JCTVC-F803-v3.zip, the entire content of which is incorporated herein by reference.

Alternatively, video encoder 20 and video decoder 30 may operate according to other proprietary or industry standards, including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The techniques of this disclosure, however, are not limited to any particular coding standard or technique.

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to various encoded portions of video data. In some cases, such syntax elements may be encoded and stored (e.g., in a storage system) prior to being received and decoded by video decoder 30. Thus, the term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image forming part of a video. In some instances, a picture may be referred to as a video "frame." Video encoder 20 may generate a bitstream that includes a sequence of bits that form a coded representation of the video data. The bitstream may include coded pictures and associated data. A coded picture is a coded representation of a picture.

To generate the bitstream, video encoder 20 may generate a series of coded pictures and associated data. The coded pictures may be encoded representations of pictures in the video data. The associated data may include sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate an encoded representation of a picture, video encoder 20 may partition the picture into a plurality of tree blocks. In some instances, a tree block may be referred to as a largest coding unit (LCU) or a "coding tree block." The tree blocks of HEVC may be broadly analogous to the macroblocks of previous standards, such as H.264/AVC. However, a tree block is not necessarily limited to a particular size and may include one or more coding units (CUs).

Each of the tree blocks may be associated with a different equally-sized block of pixels within the picture. Each pixel may comprise a luminance (Y) sample, a Cb-chrominance sample, and a Cr-chrominance sample. Thus, each tree block may be associated with a block of luminance (Y) samples, a block of Cb-chrominance samples of the picture, and a block of Cr-chrominance samples of the picture. For ease of explanation, this disclosure may refer to a two-dimensional array of pixels as a pixel block and may refer to a two-dimensional array of samples as a sample block. Video encoder 20 may use quad-tree partitioning to partition the pixel blocks associated with a tree block into pixel blocks associated with CUs, hence the name "tree blocks."

Video encoder 20 may partition a picture into a plurality of slices. Each of the slices may include an integer number of tree blocks. As part of encoding a picture, video encoder 20 may generate encoded representations of each slice of the picture i.e., coded slices). To generate a coded slice, video encoder 20 may encode each tree block of the slice to generate encoded representations of each of the tree blocks of the slice (i.e., coded tree blocks).

To generate a coded tree block, video encoder 20 may recursively perform quad-tree partitioning on the pixel block associated with a tree block to divide the pixel block into progressively-smaller pixel blocks. Each of the smaller pixel blocks may be associated with a CU. A partitioned CU may be a CU whose pixel block is partitioned into pixel blocks associated with other CUs. A non-partitioned CU may be a CU whose pixel block is not partitioned into pixel blocks associated with other CUs.

Video encoder 20 may generate one or more prediction units (PUs) for each non-partitioned CU. Each of the PUs of a CU may be associated with a different pixel block within the pixel block of the CU. Video encoder 20 may generate predictive pixel blocks for each PU of the CU. The predictive pixel blocks of a PU may be blocks of pixels.

Video encoder 20 may use intra prediction or inter prediction to generate the predictive pixel block for a PU. If video encoder 20 uses intra prediction to generate the predictive pixel block of a PU, video encoder 20 may generate the predictive pixel block of the PU based on decoded pixels of the picture associated with the PU. If video encoder 20 uses inter prediction to generate the predictive pixel block of the PU, video encoder 20 may generate the predictive pixel block of the PU based on decoded pixels of one or more pictures other than the picture associated with the PU.

Video encoder 20 may generate a residual pixel block for a CU based on predictive pixel blocks of the PUs of the CU. The residual pixel block for the CU may indicate differences between samples in the predictive pixel blocks for the PUs of the CU and corresponding samples in the original pixel blocks of the CU.

Furthermore, as part of encoding a non-partitioned CU, video encoder 20 may perform recursive quad-tree partitioning on the residual pixel blocks of the CU to partition the residual pixel blocks of the CU into one or more smaller residual pixel blocks associated with transform units (TUs) of the CU. In this way, each TU of the CU may be associated with a residual sample block of luminance (Y) samples, and two residual sample blocks of chrominance (Cr and Cb) samples.

Video coder 20 may apply one or more transforms to residual sample blocks associated with the TUs to generate coefficient blocks (i.e., blocks of coefficients) associated with the TUs. Conceptually, a coefficient block may be a two-dimensional matrix of coefficients. Video encoder 20 may perform a quantization process on a coefficient block. Quantization generally refers to a process in which coefficients are quantized to possibly reduce the amount of data used to represent the coefficients, providing further compression.

Video encoder 20 may generate sets of syntax elements that represent the coefficients in the quantized coefficient block. Video encoder 20 may apply entropy encoding operations, such as Context Adaptive Binary Arithmetic Coding (CABAC) operations, to at least some of these syntax elements. As part of performing an entropy encoding operation, video encoder 20 may select a coding context. In the case of CABAC, the coding context may indicate probabilities of 0-valued and 1-valued bins. In the case of context-adaptive variable length coding (CAVLC), the coding context may be a set of variable length codes. Video encoder 20 may use the coding context to encode one or more syntax elements.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a SPS, a PPS, a coded slice, supplemental enhancement information (SEI), an access unit delimiter, filler data, or another type of data. The data in a NAL unit may include various syntax structures. Coded slice NAL units are NAL units that include coded slices. "VCL NAL unit" is a collective term for coded slice NAL units and the subset of NAL units that have reserved values of nal_unit_type that are classified as VCL NAL units.

SEI NAL units are NAL units that include SEI messages. SEI messages include information that may be useful for error resilience, timing, output, and so on. However, SEI messages are not needed in the decoding process. In other words, a video decoder may be able to decode video data without using the information in SEI messages. Therefore, in the context of a video coding standard such as H.264/AVC or HEVC, SEI messages are normative (i.e., not informative) and are optional in the sense that conforming video decoders may choose to simply discard any SEI messages present in a bitstream. Furthermore, it may not be necessary to transmit SEI messages associated with video data in order for a video decoder to be able to decode the video data.

Video encoder 20 may divide a picture into a plurality of picture partitions. The picture partitions may be associated with non-overlapping subsets of the tree blocks of the picture. Video encoder 20 may divide the picture into a plurality of picture partitions in various ways. As described below, video encoder 20 may divide the picture into a plurality of entropy slices, a plurality of tiles, or a plurality of wavefront parallel processing (WPP) waves. This disclosure may use the term "picture partition" to refer generically to entropy slices, tiles, and WPP waves.

As mentioned above, video encoder 20 may divide the picture into a plurality of entropy slices. Entropy slices may also be referred to as lightweight slices, slices with a short slice header, or short slices. An entropy slice may include a subset of the CUs of a normal slice. In some examples, video encoder 20 may partition the CUs among entropy slices such that none of the entropy slices includes more bins (e.g., entropy coded bits) than an upper limit. In some instances, a single coded slice NAL unit may include multiple entropy slices of a slice. In other examples, each entropy slice may be included in a separate NAL unit.

In-picture prediction across entropy slice boundaries is allowed. For example, if a video coder is performing intra prediction on a particular PU, the video coder may use samples from a neighboring PU, even if the neighboring PU is in a different entropy slice than the particular PU. In this example, the video coder may not be able to use samples from the neighboring PU if the neighboring PU is in a different slice than the particular PU.

However, when a video coder is performing entropy coding on data associated with a particular PU, the video coder is only allowed to select coding contexts based on information associated with a neighboring PU if the particular PU and the neighboring PU are in the same entropy slice. Because of this restriction, the video coder may be able to perform entropy coding (i.e., entropy encoding or decoding) operations on multiple entropy slices of a slice in parallel. However, video decoder 30 is not able to reconstruct the pixel blocks of multiple entropy slices of a slice in parallel.

In some examples, video encoder 20 may divide a picture into one or more tiles. Each of the tiles may comprise an integer number of tree blocks in the picture. Video encoder 20 may divide the picture into tiles by defining two or more vertical tile boundaries and two or more horizontal tile boundaries. Each vertical side of the picture may be considered to be a vertical tile boundary. Each horizontal side of the current picture may be considered to be a horizontal tile boundary. For example, if video encoder 20 defines four vertical tile boundaries and three horizontal tile boundaries for the picture, the current picture is divided into six tiles.

A video coder, such as video encoder 20 or video decoder 30, may code the tiles of a picture according to raster scan order. Furthermore, the video coder may code each tree block within a tile according to a raster scan order. In this way, the video coder may code each tree block of a given tile of the picture before coding any tree block of another tile of the picture. Consequently, the order in which the video coder codes the tree blocks of the picture may be different if the picture is partitioned into multiple tiles than if the picture is not partitioned into multiple tiles.

In some instances, a video coder may use information associated with a spatially-neighboring CU to perform intra prediction on a particular CU, so long as the particular CU and the spatially-neighboring CU belong to the same tile and so long as the particular CU and the spatially-neighboring CU belong to the same slice. The spatially-neighboring CU may be a CU that is associated with a pixel block that is adjacent to the pixel block associated with particular CU. In some instances, the video coder may use information associated with the spatially-neighboring CU to select a context for CABAC encoding a syntax element of the particular CU, so long as the particular CU and the spatially-neighboring CU are within the same tile. Because of these restrictions, the video coder may be able to code in parallel tree blocks of multiple tiles.

For instance, in-picture prediction, including pixel value prediction, motion prediction, coding mode prediction, and entropy coding context prediction, across tile boundaries may be controlled by a flag tile_boundary_independence_idc. If the flag is equal to 1, in-picture prediction across tile boundaries is disallowed. Otherwise, in-picture prediction across tile boundaries is allowed, except for the tile boundaries that are also picture boundaries or slice boundaries. If in-picture prediction is disallowed, the functionality of tiles may be to change the tree block scan order compared to the case where there are no tiles, or equivalently, there is only one tile in a picture. If in-picture prediction is allowed, besides changing the tree block scan order, tiles may also provide independent partitioning that can be used for parallel coding (encoding and/or decoding).

Regardless of whether in-picture prediction is allowed across tile boundaries, video encoder 20 may include multiple encoded tiles in a single entropy slice in a single NAL unit. In this case, even if in-picture prediction is allowed across tile boundaries, entropy coding context prediction across tile boundaries is disallowed. Furthermore, in examples where a NAL unit can contain only a single entropy slice and an entropy slice only includes CUs of a single tile, there may be no need to signal entry points of each coded tile of the entropy slice, as the coded tiles are in separate NAL units.

In other examples, the video coder may code a picture using wavefront parallel processing (WPP). If the video coder codes the picture using WPP, the video coder may divide the tree blocks of the picture into a plurality of "WPP waves." Each of the WPP waves may correspond to a different row of tree blocks in the picture. If the video coder codes the picture using WPP, the video coder may start coding a top row of tree blocks. After the video coder has coded two or more tree blocks of the top row, the video coder may start coding a second-to-top row of tree blocks in parallel with coding the top row of tree blocks. After the video coder has coded two or more tree blocks of the second-to-top row, the video coder may start coding a third-to-top row of a tree block in parallel with coding the higher rows of tree blocks. This pattern may continue down the rows of tree blocks in the picture.

If the video coder is coding the picture using WPP, the video coder may use information associated with spatially-neighboring CUs outside a current tree block to perform intra prediction on a particular CU in the current tree block, so long as the spatially-neighboring CUs are left, above-left, above, or above-right of the current tree block. If the current tree block is the leftmost tree block in a row other than the topmost row, the video coder may use information associated with the second tree block of the immediately higher row to select a context for CABAC encoding a syntax element of the current tree block. Otherwise, if the current tree block is not the leftmost tree block in the row, the video coder may use information associated with a tree block to the left of the current tree block to select a context for CABAC encoding a syntax element of the current tree block. In this way, the video coder may initialize CABAC states of a row based on the CABAC states of the immediately higher row after encoding two or more tree blocks of the immediately higher row.

In some examples, if the video coder is coding a picture using WPP, the only tile boundaries of the picture are horizontal and vertical borders of the picture. Thus, the only tile of the picture may be the same size as the picture. The video coder may divide the picture, and hence the single tile of the picture, into multiple WPP waves.

As mentioned above, video encoder 20 may generate a coded slice NAL unit that includes an encoded representation of a slice. The slice may be associated with an integer number of consecutively coded tree blocks. The coded slice NAL unit may include a slice header and slice data. The slice data may include encoded representations of each tree block associated with the slice.

Video encoder 20 may generate the coded slice NAL unit such that encoded representations of the tree blocks are grouped within the slice data according to the picture partitions to which the tree blocks belong. For example, the coded slice NAL unit may include each coded tree block associated with a first picture partition followed by each coded tree block associated with a second picture partition, followed by each coded tree block associated with a third picture partition, and so on.

Figure 10:
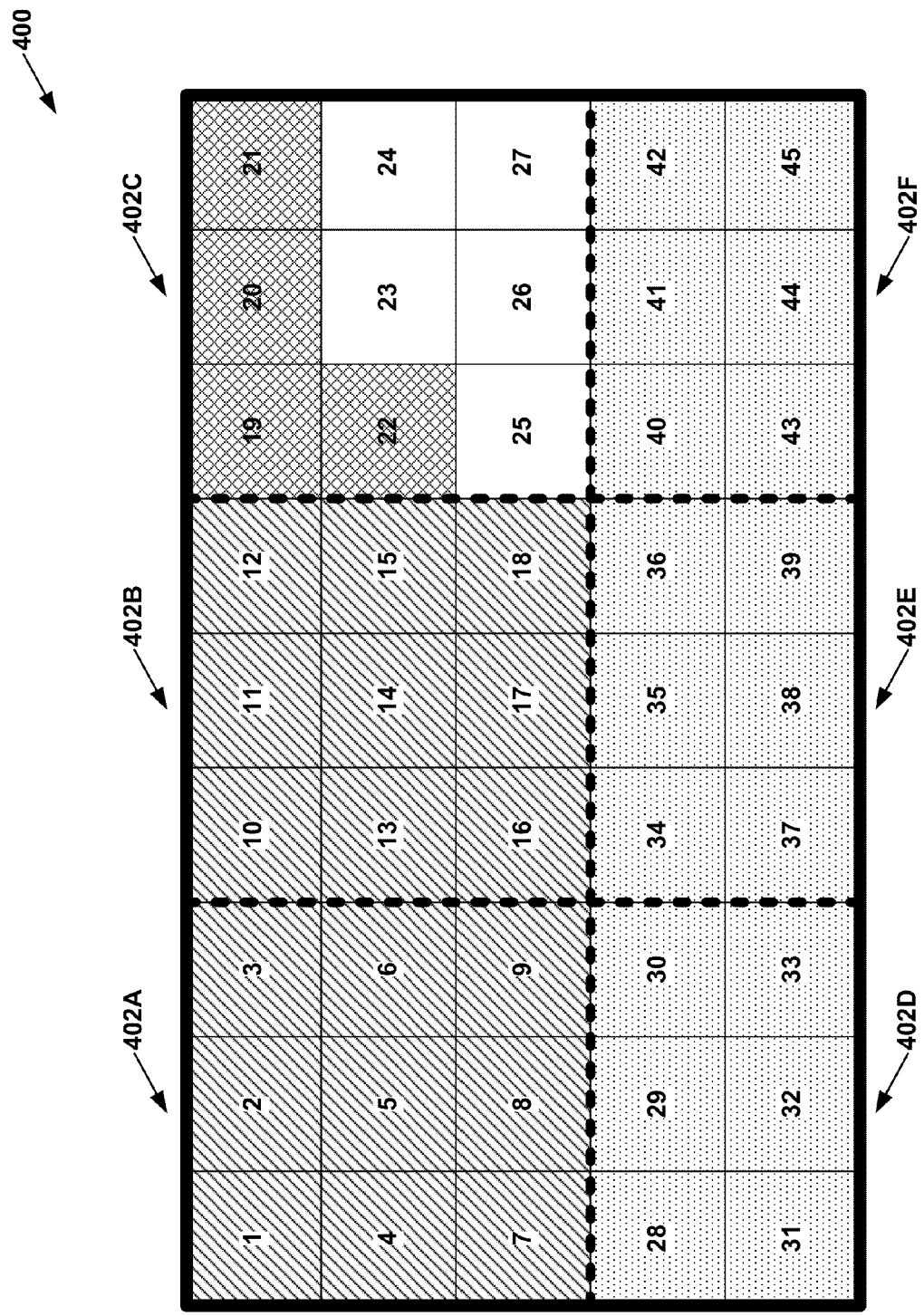
FIG. 10 is a conceptual diagram that illustrates an example coding order when a picture is partitioned into a plurality of tiles.

For ease of explanation, this disclosure may use the terms "encoded picture partition," "coded sub-slice," "coded sub-stream" to refer to a group of coded tree blocks within a coded slice NAL unit that are associated with a single picture partition (e.g., entropy slice, tile, or WPP wave). Nevertheless, it should be appreciated that there may be circumstances where a picture partition may include tree blocks in multiple slices. FIG. 10, described below, illustrates an instance where a tile includes tree blocks that belong to multiple slices and a slice includes tree blocks that belong multiple tiles.

Video decoder 30 may receive a bitstream generated by video encoder 20. The bitstream may include a coded representation of video data encoded by video encoder 20. Video decoder 30 may perform a parsing operation on the bitstream. As part of performing the parsing operation, video decoder 30 may extract syntax elements from the bitstream. As part of extracting syntax elements from the bitstream, video decoder 30 may perform entropy decoding (e.g., CABAC decoding) operations on data in the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

Video decoder 30 may generate, based on syntax elements associated with a CU, predictive pixel blocks for PUs of the CU. In addition, video decoder 30 may inverse quantize coefficient blocks associated with TUs of the CU. Video decoder 30 may perform inverse transforms on the coefficient blocks to reconstruct residual pixel blocks associated with the TUs of the CU. Video decoder 30 may reconstruct the pixel block of a CU based on the predictive pixel blocks and the residual pixel blocks. In this way, video decoder 30 may reconstruct the pixel blocks of CUs based on the syntax elements in the bitstream.

As mentioned above, some implementations of video decoder 30 may be able decode the pixel blocks of different picture partitions in parallel. For example, if a coded slice NAL unit includes a first encoded picture partition and a second encoded picture partition, video decoder 30 may be able to decode the pixel blocks of the first encoded picture partition and the pixel blocks of the second encoded picture partition in parallel.

Video decoder 30 may store a coded slice NAL unit in memory. The memory may be byte addressable. Because video decoder 30 stores the coded slice NAL unit in byte-addressable memory, video decoder 30 may be unable to indicate the memory address associated with the start of an encoded picture partition if the start of the encoded picture partition occurs within a byte. Hence, video decoder 30 may not be able to decode the encoded picture partitions in parallel if one or more of the encoded picture partitions begins within a byte. Alternatively, video decoder 30 may use bit-wise memory addressing or byte-wise plus bit-wise addressing to enable decoding the encoded picture partitions in parallel but with increased implementation and computation complexities.

To address this problem, video encoder 20 may generate coded slice NAL units in such a way that each of the encoded picture partitions within the coded slice NAL units is byte aligned. That is, each of the encoded picture partitions within a coded slice NAL unit may start at a byte boundary. If an encoded picture partition is byte aligned, the first bit of an encoded picture partition is the first bit of an addressable byte in memory and the last bit of the encoded picture partition is the last bit of an addressable byte in memory. Hence, for each byte-addressed storage location in the memory, the storage location does not store bits associated with multiple encoded picture partitions.

Furthermore, if video decoder 30 decodes encoded picture partitions in parallel, video decoder 30 may assign different encoded picture partitions to different processing cores. The processing cores may decode the encoded picture partitions in parallel. In addition, the processing cores may request the slice header from memory. In response, the memory may send the slice header to the processing cores. In this way, each of the processing cores may be able to use the slice header while decoding the encoded picture partitions. However, if the slice header is not byte aligned, the memory may not be able to send the slice header to the processing cores without also sending some information that is not in the slice header. For instance, if the slice header is not byte aligned, video decoder 30 may transcode the slice header such that the slice header is byte aligned. Transcoding slice headers may increase the complexity of video decoder 30 and may require the processing cores to be configured to process transcoded slice headers.

In order to generate a coded slice NAL unit in which each of the encoded picture partitions is byte aligned, video encoder 20 may pad the slice header of the coded slice NAL unit such that the slice header ends at a byte boundary. That is, a last bit of a slice header may be a last bit of an addressable byte in memory. Padding the slice header of a coded slice NAL unit may involve appending bits to the end of the slice header until the slice header is byte aligned.

In this way, video encoder 20 may generate a plurality of encoded picture partitions, each of the encoded picture partitions being associated with a different set of coding units in a picture in the video data. In addition, video encoder 20 may generate a NAL unit that contains a slice header and the plurality of encoded picture partitions, the slice header including one or more padding bits that align the slice header to a byte boundary. Similarly, video decoder 30 may receive a NAL unit. The NAL unit may contain a slice header and a plurality of encoded picture partitions of the video data. The slice header may include one or more padding bits that align the slice header to a byte boundary. Video decoder 30 may decode two or more of the encoded picture partitions in parallel.

To decode the encoded picture partitions in parallel, video decoder 30 may assign the encoded picture partitions to different decoding threads that run in parallel. The decoding threads may run on different processing cores. In order to assign the encoded picture partitions to different decoding threads, video decoder 30 may need to determine the memory addresses associated with the beginnings of the encoded picture partitions.

To enable video decoder 30 to determine the memory addresses associated with the beginnings of the encoded picture partitions, the slice header of the coded slice NAL unit may include entry point offsets. In some examples, the entry point offsets may indicate offsets of the memory addresses of the encoded picture partitions relative to another point. In some examples, the offsets may be relative to a beginning of the coded slice NAL unit. For example, an entry point offset in a slice header of a coded slice NAL unit may indicate that a particular encoded picture partition starts at a $312^{th}$ byte of the coded slice NAL unit. In another example, an entry point offset for an encoded picture partition in a coded slice NAL unit may be relative to a first bit of a preceding encoded picture partition in the coded slice NAL unit. For instance, an entry point offset may indicate that a particular encoded picture partition in a coded slice NAL unit may start 124 bytes after a previous encoded picture partition in the coded slice NAL unit. Furthermore, in some examples, the entry point offsets may indicate the lengths in bits or bytes of the encoded picture partitions.

In addition to offset syntax elements that indicate the entry point offsets, video encoder 20 may, in accordance with one or more techniques of this disclosure, include two additional syntax elements in the slice header. The number of tiles in the slice may be determined based on the first of the additional syntax elements. The number of bits used in each of the offset syntax elements may be determined based on a second of the additional syntax elements. In accordance with the techniques of this disclosure, video encoder 20 may entropy encode (e.g., Exponential-Golomb encode) the additional syntax elements. Because video encoder 20 entropy encodes the additional syntax elements, the additional syntax elements are represented in the bitstream using variable-length sequences of bits. Using variable-length sequences of bits to represent the additional syntax elements may result in a bitstream that includes fewer bits than when fixed-length sequences of bits are used to represent the additional syntax elements, and may enable video encoder 20 to signal more offset syntax elements than allowed by fixed-length coding that uses, for example, 5 bits.

In this way, video encoder 20 may entropy encode a first syntax element, a second syntax element, and a series of offset syntax elements. Lengths of each of the offset syntax elements may be determinable based on the first syntax element. The number of offset syntax elements in the series of offset syntax elements may be determinable based on the second syntax element. Locations of a plurality of encoded picture partitions within a NAL unit may be determinable based on the offset syntax elements. Furthermore, video encoder 20 may generate a bitstream that includes a variable-length value that represents the entropy-encoded first syntax element, a variable-length value that represents the entropy-encoded second syntax element, and fixed-length values that represent the offset syntax elements.

Video decoder 30 may receive a bitstream that includes a variable-length value that represents the first additional syntax element, an entropy-encoded variable-length value that represents a second additional syntax element, and a series of offset syntax elements. Video decoder 30 may entropy decode the first and second additional syntax elements. Furthermore, video decoder 30 may determine, based on the first syntax element, lengths of each of the offset syntax elements and may determine, based on the second syntax element, the number of offset syntax elements in the series of offset syntax elements. Video decoder 30 may parse, based at least in part on the lengths of each of the offset syntax elements and the number of offset syntax elements in the series of offset syntax elements, the offset syntax elements from the bitstream. Video decoder 30 may then determine, based at least in part on the offset syntax elements, locations of a plurality of encoded picture partitions within a NAL unit.

Furthermore, instead of (or in addition to) indicating entry point offsets in the slice header of a coded slice NAL unit, the slice data of the coded slice NAL unit may include entry point markers. The entry point markers may specify a bit pattern that is unique to entry point markers. The entry point markers may occur in the slice data immediately prior to each encoded picture partition, aside from a first encoded picture partition of the slice data. Video encoder 30 may determine the memory addresses associated with the beginnings of the encoded picture partitions by scanning through the slice data and identifying the entry point markers.

Including entry point offsets in the slice header or entry point markers in the slice data may be useful if video decoder 30 is configured to decode multiple encoded picture partitions in parallel. However, some video decoders are not configured to decode multiple encoded picture partitions in parallel. The hardware required by video decoders that are not configured to decode multiple encoded picture partitions in parallel may be simpler than the hardware required by video decoders that are configured to decode multiple encoded picture partitions in parallel. The simpler hardware may be less expensive and may consume less energy.

If video decoder 30 is not configured to decode multiple encoded picture partitions in parallel, video decoder 30 does not use the entry point offsets or the entry point markers. Thus, if video decoder 30 is not configured to decode multiple encoded picture partitions in parallel, the inclusion of the entry point offsets and/or the entry point markers in a bitstream received by video decoder 30 may unnecessarily increase the number of bits in the bitstream.

In accordance with one or more techniques of this disclosure, video encoder 20 may be configured such that video encoder 20 does not include entry point offsets and/or entry point markers in coded slice NAL units. Rather, video encoder 20 may generate a SEI message that indicates the entry points of encoded picture partitions in a coded slice NAL unit. For example, video encoder 20 may generate a SEI message that includes entry point offsets for the encoded picture partitions in a coded slice NAL unit. In other words, the SEI message may indicate the entry points by specifying byte offsets of the encoded picture partitions within the coded slice NAL unit.

Figure 2:
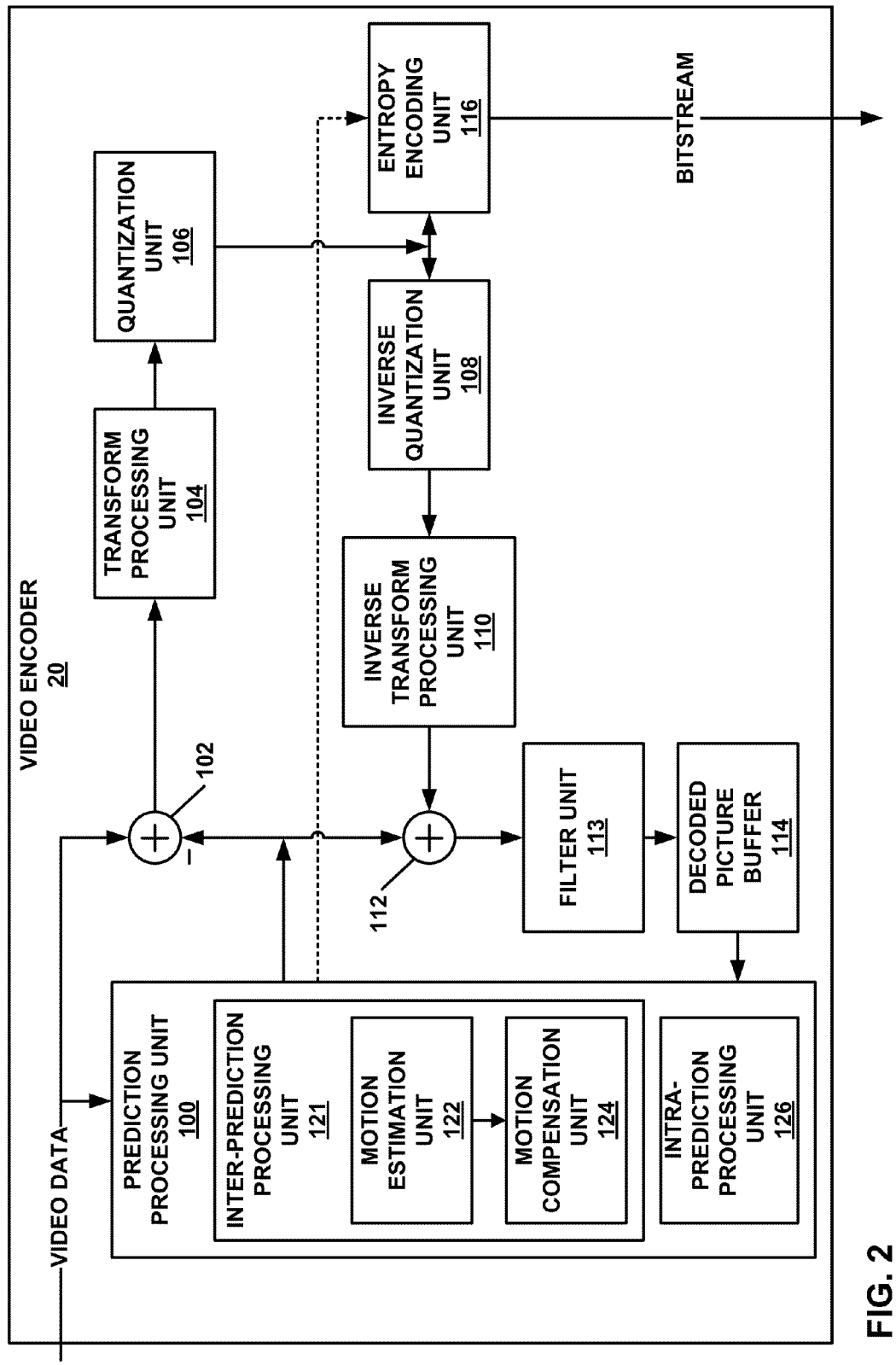
FIG. 2 is a block diagram illustrating an example video encoder that may implement the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may encode each slice of each of the pictures. As part of encoding a slice, video encoder 20 may encode each tree block in the slice.

Video encoder 20 may encode the tree blocks in the slice according to a raster scan order. In other words, video encoder 20 may encode the tree blocks of the slice in an order that proceeds from left to right across a topmost row of tree blocks in the slice, then proceeds from left to right across a next lower row of tree blocks, and so on until video encoder 20 has encoded each of the tree blocks in the slice.

As a result of encoding the tree blocks according to the raster scan order, the tree blocks above and to the left of a particular tree block may have been encoded, but tree blocks below and to the right of the particular tree block have not yet been encoded. Consequently, video encoder 20 may be able to access information generated by encoding tree blocks above and to the left of the particular tree block when encoding the particular tree block. However, video encoder 20 may be unable to access information generated by encoding tree blocks below and to the right of the particular tree block when encoding the particular tree block.

As part of encoding a tree block, prediction processing unit 100 may perform quad-tree partitioning on the pixel block associated with the tree block to divide the pixel block into progressively smaller pixel blocks. The smaller pixel blocks may be associated with CUs. For example, prediction processing unit 100 may partition each of the pixel blocks of a tree block into four equally-sized sub-blocks, partition one or more of the sub-blocks into four equally-sized sub-sub-blocks, and so on.

The sizes of the pixel blocks associated with CUs may range from 8×8 pixels up to the size of the pixel blocks associated with the tree blocks with a maximum of 64×64 samples or greater. In this disclosure, "N×N" and "N by N" may be used interchangeably to refer to the pixel dimensions of a pixel block in terms of vertical and horizontal dimensions, e.g., 16×16 pixels or 16 by 16 pixels. In general, a 16×16 pixel block has sixteen pixels in a vertical direction (y=16) and sixteen pixels in a horizontal direction (x=16). Likewise, an N×N block generally has N pixels in a vertical direction and N pixels in a horizontal direction, where N represents a nonnegative integer value.

Video encoder 20 may encode CUs of a tree block to generate encoded representations of the CUs (i.e., coded CUs). Video encoder 20 may encode the CUs of a tree block according to a z-scan order. In other words, video encoder 20 may encode a top-left CU, a top-right CU, a bottom-left CU, and then a bottom-right CU, in that order. When video encoder 20 encodes a partitioned CU, video encoder 20 may encode CUs associated with sub-blocks of the pixel blocks of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a tree block according to a z-scan order, the CUs above, above-and-to-the-left, above-and-to-the-right, left, and below-and-to-the-left of a particular CU may have been encoded. CUs below or to the right of the particular CU have not yet been encoded. Consequently, video encoder 20 may be able to access information generated by encoding some CUs that neighbor the particular CU when encoding the particular CU. However, video encoder 20 may be unable to access information generated by encoding other CUs that neighbor the particular CU when encoding the particular CU.

As part of encoding a CU, prediction processing unit 100 may partition the pixel blocks of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may perform inter prediction on each PU of the CU. Inter prediction may provide temporal compression. Inter-prediction processing unit 121 may generate predictive data for a PU. The predictive data for the PU may include predictive sample blocks that correspond to the PU and motion information for the PU. Motion estimation unit 122 may generate the motion information for the PU. In some instances, motion estimation unit 122 may use merge mode or advanced motion vector prediction (AMVP) mode to signal the motion information of the PU. Motion compensation unit 124 may generate the predictive pixel blocks of the PU based on pixel of one or more pictures other than the picture associated with the PU (i.e., reference pictures).

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." In some examples, each reference picture listed in list 0 occurs before the picture in display order. Each of the reference pictures in list 0 may be used for inter prediction of other pictures. Motion estimation unit 122 may search the reference pictures in list 0 for a reference block for a PU in a P slice. The reference block of the PU may be a pixel block that most closely corresponds to the pixel block of the PU. Motion estimation unit 122 may use a variety of metrics to determine how closely a pixel block in a reference picture corresponds to the pixel block of a PU. For example, motion estimation unit 122 may determine how closely a pixel block in a reference picture corresponds to the pixel block of a PU by sum of absolute difference (SAD), sum of square difference (SSD), or other difference metrics.

Motion estimation unit 122 may generate a reference picture index that indicates the reference picture in list 0 containing a reference block of a PU in a P slice and a motion vector that indicates a spatial displacement between the PU and the reference block. Motion estimation unit 122 may generate motion vectors to varying degrees of precision. For example, motion estimation unit 122 may generate motion vectors at one-quarter pixel precision, one-eighth pixel precision, or other fractional pixel precision. In the case of fractional pixel precision, reference block values may be interpolated from integer-position pixel values in the reference picture. Motion estimation unit 122 may output the reference picture index and the motion vector as the motion information of the PU. Motion compensation unit 124 may generate the predictive sample blocks of the PU based on the reference block associated with the motion information of the PU.

If the PU is in a B slice, the picture containing the PU may be associated with two lists of reference pictures, referred to as "list 0" and "list 1." In some examples, each reference picture listed in list 1 occurs after the current picture in display order. Furthermore, if the PU is in a B slice, motion estimation unit 122 may perform uni-directional inter prediction or bi-directional inter prediction for the PU. To perform uni-directional inter prediction for the PU, motion estimation unit 122 may search the reference pictures of list 0 or list 1 for a reference block for the PU. Motion estimation unit 122 may generate a reference picture index that indicates a position in list 0 or list 1 of the reference picture that contains the reference block and a motion vector that indicates a spatial displacement between the PU and the reference block.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the PU. The motion information of the PU may include the reference picture indexes and the motion vectors of the PU. Motion compensation unit 124 may generate the predictive sample blocks of the PU based on the reference blocks indicated by the motion information of the PU.

As part of performing an encoding operation on a CU, intra-prediction processing unit 126 may perform intra prediction on PUs of the CU. Intra prediction may provide spatial compression. Intra-prediction processing unit 126 may generate predictive data for a PU based on decoded samples in the same picture as the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction and/or gradient associated with the infra prediction mode. The neighboring PUs may be above, above and to the right, above and to the left, or to the left of the PU, assuming a left-to-right, top-to-bottom encoding order for PUs, CUs, and tree blocks. Intra-prediction processing unit 126 may use various numbers of intra prediction modes, e.g., 33 directional intra prediction modes. In some examples, the number of intra prediction modes may depend on the size of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data.

Prediction processing unit 100 may perform quad-tree partitioning to partition the residual pixel block of a CU into sub-blocks. Each undivided residual pixel block may be associated with a different TU of the CU. The sizes and positions of the residual pixel blocks associated with TUs of a CU may or may not be based on the sizes and positions of pixel blocks of the PUs of the CU. A quad-tree structure known as a "residual quad-tree" (RQT) may include nodes associated with each of the residual pixel blocks. The TUs of a CU may correspond to leaf nodes of the RQT.

Because the pixels of the residual pixel blocks of the TUs comprise Y, Cb, and Cr samples, each of the TUs may be associated with a sample block of Y samples, a sample block of Cb samples, and a sample block of Cr samples. Residual generation unit 102 may generate residual sample blocks for a CU by subtracting predictive sample blocks of PUs of the CU from corresponding samples of the sample blocks of the CU.

Transform processing unit 104 may generate coefficient blocks for each TU of a CU by applying one or more transforms to the residual sample blocks associated with the TU. Each of the coefficient blocks may be a 2D matrix of coefficients. Transform processing unit 104 may apply various transforms to a residual sample block associated with a TU. For example, transform processing unit 104 may apply a discrete cosine transform (DCT), a directional transform, or a conceptually similar transform to the residual sample block associated with a TU.

Quantization unit 106 may quantize the coefficients in a coefficient block associated with a TU. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Video encoder 20 may associate a QP value with a CU in various ways. For example, video encoder 20 may perform a rate-distortion analysis on a tree block associated with the CU. In the rate-distortion analysis, video encoder 20 may generate multiple coded representations of the tree block by encoding the tree block multiple times with different QP values. Video encoder 20 may signal that a particular QP value is associated with the CU when the particular QP value is associated with the CU in a coded representation of the tree block that has a lowest bitrate and distortion metric.

Inverse quantization unit 108 and inverse transform processing unit 110 may apply inverse quantization and inverse transforms to a coefficient block, respectively, to reconstruct a residual sample block from the coefficient block. Reconstruction unit 112 may add the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the sample blocks of the CU.

Filter unit 113 may perform a deblocking operation to reduce blocking artifacts in sample blocks associated with a CU. Decoded picture buffer 114 may store the reconstructed sample blocks after filter unit 113 performs the one or more deblocking operations on the reconstructed sample blocks. Motion estimation unit 122 and motion compensation unit 124 may use a reference picture that contains the reconstructed sample blocks to perform inter prediction on PUs of subsequent pictures. In addition, intra-prediction processing unit 126 may use reconstructed sample blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, Exponential-Golomb coding, or another type of entropy encoding operation on the data. Entropy encoding unit 116 may output a bitstream that includes the entropy-encoded data.

As part of performing an entropy encoding operation on the data, entropy encoding unit 116 may select a context model. If entropy encoding unit 116 is performing a CABAC operation, the context model may indicate estimates of probabilities of particular bins having particular values. In the context of CABAC, the term "bin" may be used to refer to a bit of a binarized version of a syntax element.

As discussed above, video encoder 20 may generate a bitstream that includes an encoded representation of video data. The encoded representation of the video data may include a plurality of NAL units. The NAL units may include coded slice NAL units that include coded representations of slices. Because a slice may include tree blocks associated with multiple picture partitions (e.g., entropy slices, tiles, or WPP waves), a coded slice NAL unit may include multiple encoded picture partitions. As indicated above, an encoded picture partition may be a group of coded tree blocks within a coded slice NAL unit that are associated with a single picture partition.

Each of the coded slice NAL units may include a slice header and slice data. The slice data of a coded slice NAL unit may include a coded representation of each tree block in a slice. In some instances, the tree blocks of a slice may be associated with different picture partitions. Accordingly, the slice data of a single coded slice NAL unit may include encoded tree blocks associated with multiple picture partitions. As indicated above, the terms "encoded picture partition" and "coded sub-slice" may be used to refer to a group of coded tree blocks within a coded slice NAL unit that are associated with a single picture partition.

Video decoder 30 may be configured to parse or decode multiple encoded picture partitions in parallel. To facilitate concurrent parsing or decoding of multiple encoded picture partitions, each of the encoded picture partitions may be byte-aligned. That is, the first bit of an encoded picture partition is the first bit of an addressable byte in memory and the last bit of the encoded picture partition is the last bit of an addressable byte in memory.

To ensure that the encoded picture partitions in the slice data of a coded slice NAL unit are byte-aligned, the slice header of a coded slice NAL unit may, in accordance with the techniques of this disclosure, terminate at a byte boundary. In some instances, both a beginning and end of the slice header may be byte aligned. For instance, video encoder 20 may generate coded slice NAL units with byte-aligned slice headers for slices that include tree blocks in multiple encoded byte-aligned entropy slices, tiles, or WPP waves (i.e., encoded picture partitions).

In some examples, video encoder 20 may include a flag (e.g., slice_header_byte_aligned_flag) in a parameter set, such as a SPS, a PPS, or an APS. If the flag is equal to 1, the slice headers of each coded slice NAL unit that refers to the parameter set are byte aligned. In such examples, if the flag is equal to 0, the slice headers of each coded slice NAL unit that refers to the parameter set may or may not be byte aligned. In other examples, the semantics of the flag may be reversed. In other examples, the slice headers of coded slice NAL units are always byte-aligned. This may be equivalent to the above-mentioned flag not being present and the value of the flag always being inferred to be equal to 1.

In this way, video encoder 20 may generate and video decoder 30 may receive a NAL unit that includes a parameter set. In different examples, the parameter set may be a SPS, a PPS, or an APS. The parameter set may include a syntax element that indicates whether slice headers that refer to the parameter set are byte aligned.

In examples where video encoder 20 generates byte-aligned slice headers, the slice headers may conform to various syntaxes. For example, video encoder 20 may generate slice headers that conform to the example syntax indicated in Table 1, below.

TABLE 1

Slice header syntax

| slice_header( ) { | Descriptor |
|---|---|
| ... | |
| if( slice_header_byte_aligned_flag ) | |
| while( !byte_aligned( ) ) | |
| bit_equal_to_one | f(1) |
| } | |

For ease of explanation, existing syntax elements are omitted from the example syntax of Table 1. In the example syntax of Table 1, the bit_equal_to_one syntax element is a bit that has a value equal to one. The byte_aligned( ) function may return a value that indicates whether the slice header is byte aligned.

Furthermore, in accordance with the techniques of this disclosure, the bitstream may include one or more SEI messages that indicate entry points of encoded picture partitions in coded slice NAL units. For ease of explanation, this disclosure may refer to an SEI message that indicates entry points of encoded picture partitions in a coded slice NAL unit as an "entry point SEI message."

In some examples, SEI messages include payloadType syntax elements that specify the payload types of the SEI messages. In some such examples, the payloadType syntax element of entry point SEI messages may be distinct from the payloadType syntax elements of any other type of SEI messages. Thus, an entry point SEI message may include a syntax element that indicates that the entry point SEI message belongs to a type of SEI messages that indicate entry points of encoded picture partitions in coded slice NAL units.

The bitstream may include SEI NAL units that include entry point SEI messages. In some examples, the entry point SEI message in an SEI NAL unit may apply to the coded slice NAL unit that immediately follows the SEI NAL unit. Thus, video decoder 30 may determine, based at least in part on a SEI NAL unit immediately preceding in the bitstream a NAL unit that contains the plurality of encoded picture partitions, that the SEI message is applicable to the NAL unit that contains the plurality of encoded picture partitions. For ease of explanation, the coded slice NAL unit to which the SEI message applies may be referred to in this disclosure as the coded slice NAL unit of the entry point SEI message.

In some examples, SEI messages are associated with levels that indicate units to which the SEI messages are applicable. Entry point SEI messages may be applicable to the coded slice NAL units that follow the SEI NAL units that contain the entry point SEI messages. Alternatively, entry point SEI messages may be applicable to the coded slices included in the coded slice NAL units that follow the SEI NAL units that contain the entry point SEI messages. Thus, entry point SEI messages may be NAL unit-level SEI messages or slice-level SEI messages.

Furthermore, in some examples, if a coded slice NAL unit is the first video coding layer (VCL) NAL unit of a picture, the SEI NAL unit containing an entry point SEI message applicable to the coded slice NAL unit may have a NAL unit type equal to 10. Otherwise, if a coded slice NAL unit is not the first VCL NAL unit of a picture, the SEI NAL unit containing an entry point SEI message applicable to the coded slice NAL unit may have a NAL unit type equal to 11. "VCL NAL unit" is a collective term for coded slice NAL units and the subset of NAL units that have reserved values of nal_unit_type that are classified as VCL NAL units. Types of NAL units that are not VCL NAL units may be referred to as non-VCL NAL units. Example types of non-VCL NAL units include SPS NAL units, PPS NAL units, SEI NAL units, and so on. nal_unit_type is a syntax element in a header of a NAL unit that specifies a NAL unit type of the NAL unit.

Video encoder 20 may generate entry point SEI messages that have various syntaxes. For example, video encoder 20 may generate entry point SEI messages that have the syntax illustrated in Table 2, below.

TABLE 2

Syntax of Entry point SEI messages

| entry_offset( payloadSize ) { | Descriptor |
|---|---|
| offset_len_minus10 | ue(v) |
| num_offsets_minus1 | ue(v) |
| for( i = 0; i <= num_substreams_minus1; i++) | |
| substream_offset[ i ] | u(v) |
| } | |

In the example syntax of Table 2, the offset_len_minus10 syntax element, plus 10, specifies the length, in bits, of the substream_offset[i] syntax element. In this way, the lengths of each of the offset syntax elements are equal to a value of the offset_len_minus10 syntax element plus 10. Furthermore, in the example syntax of Table 2, the num_offsets_minus1 syntax element, plus 1, specifies the number of substream_offset [i] syntax elements in the entry point SEI message.

In the example syntax of Table 2, the substream_offset[i] syntax element specifies the i-th offset, in bytes. The coded slice NAL unit of the entry point SEI message may consist of num_offsets_minus1 plus 2 encoded picture partitions, with encoded picture partition index values 0, 1, 2, . . . , num_offsets_minus1+1. Encoded picture partition 0 may consist of bytes 0 to substream_offset[0]−1, inclusive, of the coded slice NAL unit of the entry point SEI message. Encoded picture partition k, with k in the range of 1 to num_offsets_minus1+1, inclusive, may consist of bytes substream_offset[k−1] to substream_offset[k]−1, inclusive, of the coded slice NAL unit of the entry point SEI message.

In this way, video encoder 20 may signal a syntax element from which lengths in bits of offset syntax elements is determinable. In addition, video encoder 20 may signal a syntax element from which the number of offset syntax elements in the series of offset syntax elements is determinable. Furthermore, video encoder 20 may signal the series of offset syntax elements, wherein offset syntax elements in the series of offset syntax elements indicate the byte offsets of the encoded picture partitions within the NAL unit. Likewise, video decoder 30 may receive, in the bitstream, a syntax element that specifies a length in bits of a series of offset syntax elements. Video decoder 30 may also receive, in the bitstream, a syntax element that specifies the number of offset syntax elements in the series of offset syntax elements. In addition, video decoder 30 may receive, in the bitstream, the series of offset syntax elements, wherein the offset syntax elements in the series of offset syntax elements indicate the byte offsets of the encoded picture partitions within the NAL unit.

In some example syntaxes other than the example syntax of Table 2, the length of substream_offset[i] is one of 1, 2, 3, and 4 bytes. The length of substream_offset[i] may be indicated by a syntax element that has a value equal to 0, 1, 2, or 3, corresponding to lengths of 1, 2, 3, and 4 bytes, respectively. In such examples, this syntax element may replace the offset_len_minus10 syntax element of Table 2. Furthermore, in various other example syntaxes for entry point SEI messages, the offset_len_minus10 syntax element of Table 2 is replaced with the offset_len_minus8 syntax element and a minimum length for substream_offset[i] syntax elements is eight bits.

As described above, in-picture prediction across picture partitions (e.g., entropy slices, coded tiles or wavefront waves) may be allowed. Thus, the decoding of one encoded picture partition may be dependent on the decoding of another encoded picture partition. In some examples, the encoded picture partitions are encapsulated in different NAL units and the NAL units are encapsulated in different packets, e.g., Real-time Transport Protocol (RTP) packets. Because different NAL units may contain dependent encoded picture partitions, the loss of one of these NAL units may prevent video decoder 30 from decoding the encoded picture partitions in the other NAL units. Thus, it may be advantageous to include multiple NAL units containing in one packet. In some conventional CODECs, a packetizer may be unable to determine from information in a NAL unit header of a coded slice NAL unit that the coded slice NAL unit contains an encoded picture partition. Rather, in such CODECs, information that indicates that a coded slice NAL unit contains an encoded picture partition may only be present in a slice header of the coded slice NAL unit. The slice header of a coded slice NAL unit is entropy encoded. Thus, determining that a coded slice NAL unit contains an encoded picture partition may require the packetizer to entropy decode the slice header of the coded slice NAL unit, which adds complexity to the packetizer.

NAL unit to indicate the type of the NAL unit. In some examples, the "nal_unit_type" syntax element may be six bits. In such examples, the value specified by the "nal_unit_type" syntax element may range from 0 to 63. In this disclosure, ranges are presumed to be inclusive unless otherwise indicated. NAL units with "nal_unit_type" syntax elements equal to 0 or in the range from 48 to 63 may not affect the decoding process. Rather, NAL units with "nal_unit_type" syntax elements equal to 0 or in the range from 48 to 63 may be used as determined by an application. No decoding process is specified for NAL units with "nal_unit_type" syntax elements equal to 0 or in the range from 48 to 63. Different applications may use NAL units with "nal_unit_type" syntax elements equal to 0 or in the range from 48 to 63 for different purposes. Thus, different NAL unit types are assigned to SEI NAL units containing information with different application scopes. In other examples, the "nal_unit_type" syntax element may be five bits, as in HEVC WD4. In examples where the "nal_unit_type" syntax element is five bits, the value of the "nal_unit_type" syntax element may range from 0 to 31.

Table 3, presented below, illustrates an example relationship between values of the "nal_unit_type" syntax element, the content of NAL units and Raw Byte Sequence Payload (RBSP) syntax structures of NAL units, and NAL unit type classes.

TABLE 3

| nal_unit_type | Content of NAL unit and RBSP syntax structure | NAL unit type class |
| --- | --- | --- |
| 0 | Unspecified | non-VCL |
| 1 | Coded slice of a non-IDR and non-CRA picture slice_layer_rbsp( ) | VCL |
| 2 | Coded sub-slice of a non-IDR and non-CRA picture slice_layer_rbsp( ) | VCL |
| 3 | Coded slice of a CRA picture slice_layer_rbsp( ) | VCL |
| 4 | Coded sub-slice of a CRA picture slice_layer_rbsp( ) | VCL |
| 5 | Coded slice of an IDR picture slice_layer_rbsp( ) | VCL |
| 6 | Coded sub-slice of an IDR picture slice_layer_rbsp( ) | VCL |
| 7 | Sequence parameter set seq_parameter_set_rbsp( ) | non-VCL |
| 8 | Picture parameter set pic_parameter_set rbsp( ) | non-VCL |
| 9 | Adaptation parameter set aps_rbsp( ) | non-VCL |
| 10 | Supplemental enhancement information (SEI) sei_rbsp( ) | non-VCL |
| 11 | Sub-picture supplemental enhancement information (SEI) sei_rbsp( ) | non-VCL |
| 12 | Access unit delimiter access_unit_delimiter_rbsp( ) | non-VCL |
| 13 | Filler data filler_data_rbsp( ) | non-VCL |
| 13-47 | Reserved | n/a |
| 48 . . . 63 | Unspecified | non-VCL |

To reduce the complexity of the packetizer, a distinct NAL unit type may be allocated to NAL units that contain a single encoded picture partition for which in-picture prediction across picture partition boundaries is allowed. Furthermore, different NAL unit types may be allocated to SEI NAL units containing information with different application scopes.

Video encoder 20 may indicate the type of a NAL unit in various ways. For example, video encoder 20 may include a "nal_unit_type" syntax element in a NAL unit header of a In the example of Table 3, NAL units with "nal_unit_type" syntax elements in the range of 1 to 6 are coded slice NAL units. If a NAL unit contains data associated with a slice or sub-slice of a particular picture and the NAL unit has a "nal_unit_type" syntax element equal to 5 or 6, NAL units with "nal_unit_type" syntax elements equal to 1 through 4 may not contain data associated with the particular picture. If a NAL unit contains data associated with a slice or a sub-slice of a particular picture and the NAL unit has a "nal_unit_type"

syntax element equal to 5 or 6, the picture may be an Instantaneous Decoder Refresh (IDR) picture. As indicated in Table 3, NAL units that contain coded sub-slices and coded slice NAL units that do not contain coded sub-slices may include RBSPs that conform to the same syntax.

If a NAL unit has a "nal_unit_type" syntax element equal to 2, 4, or 6, the NAL unit contains a sub-slice. For example, a NAL unit may have a "nal_unit_type" syntax element with a value of 2, 4, or 6 if the NAL unit contains data associated with a slice that has a "lightweight_slice_flag" equal to 1 (i.e., a lightweight slice). For ease of explanation, NAL units having "nal_unit_type" syntax elements equal to 2, 4, or 6 may be referred to herein as sub-slice NAL units. Thus, the NAL units that contain coded sub-slices may belong to a different NAL unit type than coded slice NAL units that do not contain coded sub-slices. For instance, the NAL units that contain the coded sub-slices may include type syntax elements that specify a number that is different than numbers specified by type syntax elements of the coded slice NAL units that do not contain coded sub-slices. During decoding, video decoder 30 may require data from another slice or sub-slice in order to perform in-picture prediction within a sub-slice.

If a NAL unit has a "nal_unit_type" syntax element that is equal to 10 or 11, the NAL unit is an SEI NAL unit. An SEI NAL unit with a "nal_unit_type" syntax element equal to 10 may contain an SEI message that is applicable to one or more entire coded pictures. An SEI NAL unit with "nal_unit_type" syntax elements equal to 10 may precede the first VCL NAL unit of a coded picture.

An SEI NAL unit with a "nal_unit_type" syntax element equal to 11 may be referred to herein as a sub-picture SEI NAL unit. A sub-picture SEI NAL unit may contain an SEI message that is applicable to a list of one or more consecutive VCL NAL units of a coded picture. The list may include a true subset of all VCL NAL units of the coded picture and does not include the first VCL NAL unit of the coded picture. A sub-picture SEI NAL unit may precede the first VCL NAL unit of the list of VCL NAL units to which the SEI messages included in the sub-picture SEI NAL unit apply.

In other examples, values of the "nal_unit_type" syntax element may have meanings different than those indicated in Table 3. For instance, in other examples, intra slices (i.e., I slices) and inter slices (i.e., P slices and B slices) may have different NAL unit types. In other words, there may be a first value of the "nal_unit_type" syntax element for I slices and a second value of the "nal_unit_type" syntax element for P slices and B slices. In yet other examples, there may be a first value of the "nal_unit_type" syntax element for I slices, a second value of the "nal_unit_type" syntax element for P slices, and a third value of the "nal_unit_type" syntax element for B slices. In yet other examples, there may be different values of the "nal_unit_type" syntax element for NAL units that contain data representing short slices (i.e., slices with the "lightweight_slice_header" syntax element equal to 1) and NAL units that contain data representing full slices (i.e., slices with the "lightweight_slice_header" syntax element equal to 0).

In yet another example alternative to Table 3, SEI messages may be categorized into levels. Each of the levels may be associated with a different value of the "nal_unit_type" syntax element. The levels of the SEI messages may include:
1) Sequence-level: applicable to one or more entire coded video sequences.
2) Sub-sequence level: applicable to more than one coded picture but less than one coded video sequence.
3) Picture-level: applicable to all VCL NAL units in one access unit.
4) Sub-picture-level: applicable to a true subset of all VCL NAL units in an access unit. For example, SEI messages at the sub-picture level may be applicable to the VCL NAL units that cover a certain region of interest, the VCL NAL unit of a layer representation as defined in Annex G of the H.264/AVC standard, the VCL NAL units of a view component as defined in Annex H of the H.264/AVC standard, or the VCL NAL units of a redundant coded picture as defined by the H.264/AVC standard.

A bitstream may be divided into a series of access units. Each of the access units may contain one coded picture and zero or more non-VCL NAL units. The first access unit of the bitstream starts with the first NAL unit of the bitstream. The first of any of the following NAL units after the last VCL NAL unit of a coded picture may specify the start of a new access unit.

Access unit delimiter NAL unit (when present).
Sequence parameter set NAL unit (when present).
Picture parameter set NAL unit (when present).
Adaptation parameter set NAL unit (when present).
SEI NAL unit with "nal_unit_type" equal to 10 (when present).
NAL units with "nal_unit_type" in the range 14 to 29 (when present).
First VCL NAL unit of a coded picture (always present).

Video encoder 20 and video decoder 30 may obey the following constraints with regard to the order of the coded pictures and non-VCL NAL units within an access unit:
When an access unit delimiter NAL unit is present, the access unit delimiter NAL is the first NAL unit. There may only be one access unit delimiter NAL unit in any access unit.
When an SEI NAL unit has a "nal_unit_type" syntax element equal to 10, the SEI NAL unit precedes the first VCL NAL unit of the coded picture.
When an SEI NAL unit has a "nal_unit_type" syntax element equal to 11, the SEI NAL unit succeeds the first VCL NAL unit of the coded picture and precedes the first VCL NAL unit to which the SEI NAL unit applies. Thus, the SEI NAL unit precedes the last VCL NAL unit of the coded picture.
When an SEI NAL unit contains a buffering period SEI message, the SEI NAL unit may have a "nal_unit_type" syntax element equal to 10 and the buffering period SEI message is the first SEI message payload of the first SEI NAL unit in the access unit.
NAL units having "nal_unit_type" syntax elements equal to 0, 11, 13, or in the range of 30 to 63 do not precede the first VCL NAL unit of the coded picture.

SPS NAL units, PPS NAL units, or APS NAL units may be present in an access unit, but may not follow the last VCL NAL unit of the primary coded picture within the access unit.

In this way, video encoder 20 may implement a method for encoding video data. The method may comprise generating a plurality of NAL units. The method may also comprise identifying a subset of the NAL units that contain coded sub-slices based on NAL unit types of the NAL units. In addition, the method may comprise generating a packet that contains the subset of the NAL units. Similarly, video decoder 30 may implement a method for decoding video data that comprises receiving a packet that contains multiple NAL units, each of the NAL units containing coded sub-slices, each of the NAL units including a type indicator that indicates that the NAL units belong to a type of NAL units that contain coded sub-slices (i.e., encoded picture partitions). The method for decoding the video data may also comprise decoding the sub-slices.

In other examples, video encoder 20 may generate a single NAL unit that contains data associated with multiple sub-slices. For instance, video encoder 20 may generate a single coded slice NAL unit that contains data associated with multiple lightweight slices. In such examples, the lightweight slices within the NAL unit may be byte aligned and video encoder 20 may signal byte offsets of the data associated with each of the sub-slices, aside from the data associated with the first of the sub-slices. Video decoder 30 may use the byte offsets to allocate different ones of the sub-slices to different processing cores for decoding. In this way, video decoder 30 may decode the data associated with the sub-slices in parallel. However, if video decoder 30 does not decode sub-slices in parallel, video decoder 30 may ignore the byte offsets. Consequently, if video decoder 30 does not decode sub-slices in parallel, it may be inefficient to send the byte offsets.

In some examples, tiles may be used to realize gradual decoding refresh (GDR). For example, video encoder 20 may partition each picture in a sequence of pictures into tiles the same way. For instance, video encoder 20 may use the same nine vertical tile boundaries to partition each of the pictures into eight tiles. In this example, the leftmost tile may be tile 0, the second tile from the left may be tile 1, and so on. Each of the pictures contains at least one P slice. Consequently, at least part of each picture in the sequence is dependent on at least one other picture. In the first picture of the sequence (i.e., picture 0), all tree blocks in tile 0 are intra-coded and the tree blocks in all of the remaining tiles of the first picture are inter-coded. In the second picture of the sequence (i.e., picture 1), all tree blocks in tile 1 are intra-coded and the tree blocks in all of the remaining tiles of the second picture are inter-coded. This pattern may continue through the pictures in the sequence. In other words, in picture N of the sequence of pictures, all tree blocks in tile N/8 are intra-coded and the tree blocks in all other tiles are inter-coded, for any value N in the range of 0 to the number of pictures in the sequence minus one. In the previous sentence, "/" indicates modular division (i.e., the modulo operator). Each picture with an index value N for which N/8 is equal to 0 can be used as a random access point in the sense that if decoding starts from the picture, all pictures aside from the next seven pictures can be fully decoded. In other examples, other numbers of tiles may be used. For instance, video encoder 20 may implement GDR with only two tiles per picture.

Random access refers to decoding of a coded video bitstream starting from any coded picture, particularly from a coded picture that is not the first coded picture in the video bitstream. A coded picture picP is a random access point (RAP) if all coded pictures that follow a coded picture picQ in both decoding order and output order can be correctly decoded when decoding starts from picP. picQ may or may not be the same as picP. A RAP may be an IDR picture or a non-IDR picture. All coded pictures that follow an IDR picture in decoding order can be decoded without inter prediction from any picture that precedes the IDR picture in decoding order. A non-IDR picture is any picture that is not an IDR picture.

A non-IDR random access point is a coded picture for which the following conditions are true:
 The non-IDR random access point (picR) is not an IDR picture.
 Let the picture order count (POC) of the picR be rPoc, let picA be a picture that follows picR in the same coded video sequence in both the decoding order and the output order, and let the POC of picA be aPoc. When random access is performed at picR (i.e., when decoding starts from picR), all pictures that are in the same coded video sequence and follow a picture picA in output order can be correctly decoded.

A non-IDR RAP is a clean random access (CRA) picture if all pictures that are in the same coded video sequence as the non-IDR RAP and follow the non-IDR RAP in output order can be correctly decoded when random access is performed at the non-IDR RAP. If this is not true, the non-IDR RAP may be referred to as a gradual decoding refresh (GDR) picture.

Each picture in a GDR sequence may have its own PPS. Each of the PPSs specifies the tile boundaries. In other words, syntax elements indicating the tile boundaries may be replicated in the PPSs for each picture on the GDR sequence. This may be a waste of bits and may impose the need for in-band PPS updates, which may impose error resilience problems.

In some examples, video encoder 20 may enable a changing tile boundary where pictures only include two tiles. For instance, video encoder 20 may partition each picture in a sequence of pictures into a pair of tiles. In this instance, video encoder 20 may enable a changing tile boundary only for pictures with a single vertical or horizontal tile boundary that is not at a picture boundary. The tile boundary may move from picture-to-picture. For instance, if the tile boundary is vertical, the tile boundary may move from left-to-right or from right-to-left. If the tile boundary is horizontal, the tile boundary may move upwards or downwards.

Movement of the tile boundary may be signaled in various ways. For instance, video encoder 20 may generate one or more syntax element that indicate movement of the tile boundary from picture-to-picture within the sequence. Such syntax elements may be located within various syntax structures. For example, video encoder 20 may generate a parameter set that includes at least some of the syntax elements that indicate the movement and position of the tile boundary. In this example, the parameter set may be a SPS, a PPS, an APS, or another type of parameter set. In some such examples, the movement and position of the tile boundary may be indicated in combination with syntax elements in a SPS and/or a PPS. In other examples, the movement and position of the tile boundary is only indicated by one or more syntax elements in the APS or slice header. In other examples, video encoder 20 may generate a slice header that comprises one or more syntax elements that indicate the movement and position of the tile boundary.

In yet another example, syntax elements in a SPS and a slice header indicate the movement and position of the tile boundary. In this example, Table 4 provides a syntax for a SPS RBSP. Table 5 provides a syntax for a slice header. Together, syntax elements in the SPS RBSP of Table 4 and the slice header of Table 5 signal the movement of the tile boundary.

TABLE 4

| seq_parameter_set_rbsp( ) { | Descriptor |
| --- | --- |
| profile_idc | u(8) |
| reserved_zero_8bits /* equal to 0 */ | u(8) |
| level_idc | u(8) |
| seq_parameter_set_id | ue(v) |
| pic_width_in_luma_samples | u(16) |
| pic_height_in_luma_samples | u(16) |

TABLE 4-continued

| seq_parameter_set_rbsp( ) { | Descriptor |
|---|---|
| bit_depth_luma_minus8 | ue(v) |
| bit_depth_chroma_minus8 | ue(v) |
| bit_depth_luma_increment | ue(v) |
| bit_depth_chroma_increment | ue(v) |
| log2_max_frame_num_minus4 | ue(v) |
| pic_order_cnt_type | ue(v) |
| if( pic_order_cnt_type == 0 ) | |
|   log2_max_pic_order_cnt_lsb_minus4 | ue(v) |
| else if( pic_order_cnt_type == 1 ) { | |
|   delta_pic_order_always_zero_flag | u(1) |
|   offset_for_non_ref_pic | se(v) |
|   num_ref_frames_in_pic_order_cnt_cycle | ue(v) |
|   for( i = 0; i<num_ref_frames_in_pic_order_cnt_cycle; i++ ) | |
|     offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff max_min_transform_block_size | ue(v) |
| max_transform_hierarchy_depth_inter | ue(v) |
| max_transform_hierarchy_depth_intra | ue(v) |
| interpolation_filter_flag | u(1) |
| num_tile_columns_minus1 | ue(v) |
| num_tile_rows_minus1 | ue(v) |
| if( num_tile_columns_minus1 != 0 \|\| num_tile_rows_minus1 != 0) { | |
|   tile_boundary_independence_idc | u(1) |
|   if( num_tile_columns_minus1 + num_tile_rows_minus1 == 1) // one is equal to 0, and the other is equal to 1 | |
|     dynamic_tile_boundary_flag | u(1) |
|   if( dynamic_boundary_flag ) { | |
|     tile_boundary_change_direction_flag | u(1) |
|     tile_boundary_change_rate_minus1 | ue(v) |
|   } | |
|   else { | |
|     uniform_spacing_idc | u(1) |
|     if( uniform_spacing_idc != 1) { | |
|       for( i=0; i<num_tile_columns_minus1 ; i++) | |
|         column_width[i] | ue(v) |
|       for( i=0; i <num_tile_rows_minus1; i++) | |
|         row_height[i] | ue(v) |
|     } | |
|   } | |
| } | |
| rbsp_trailing_bits( ) | |
| } | |

TABLE 5

| slice_header( ) { | Descriptor |
|---|---|
| lightweight_slice_flag | u(1) |
| if( !lightweight_slice_flag) { | |
|   slice_type | ue(v) |
|   pic_parameter_set_id | ue(v) |
|   frame_num | u(v) |
|   if( IdrPicFlag ) | |
|     idr_pic_id | ue(v) |
|   if( pic_order_cnt_type == 0 ) | |
|     pic_order_cnt_lsb /* | u(v) |
|   if( slice_type == P \|\| slice_type == B ) { | |
|     num_ref_idx_active_override_flag | u(1) |
|     if( num_ref_idx_active_override_flag ) { | |
|       num_ref_idx_l0_active_minus1 | ue(v) |
|       if( slice_type == B ) | |
|         num_ref_idx_l1_active_minus1 | ue(v) |
|     } | |
|   } | |
|   ref_pic_list_modification( ) | |
|   ref_pic_list_combination( ) | |
|   if( nal_ref_idc != 0 ) | |
|     dec_ref_pic_marking( ) | |
| } | |
| if( entropy_coding_mode_flag && slice_type != I) | |
|   cabac_init_idc | ue(v) |

TABLE 5-continued

| slice_header( ) { | Descriptor |
|---|---|
| first_slice_in_pic_flag | u(1) |
| if( first_slice_in_pic_flag == 0 ) | |
|   slice_address | u(v) |
| if( !lightweight_slice_flag) { | |
|   slice_qp_delta | se(v) |
|   if( sample_adaptive_offset_enabled_flag ) | |
|     sao_param( ) | |
|   if( deblocking_filter_control_present_flag ) { | |
|     disable_deblocking_filter_idc | |
|     if( disable_deblocking_filter_idc != 1 ) { | |
|       slice_alpha_c0_offset_div2 | |
|       slice_beta_offset_div2 | |
|     } | |
|   } | |
| if( slice_type == B ) | |
|   collocated_from_l0_flag | u(1) |
| if( adaptive_loop_filter_enabled_flag ) { | |
|   if( !shared_pps_info_enabled_flag ) | |
|     alf_param( ) | |
|   alf_cu_control_param( ) | |

TABLE 5-continued

| slice_header( ) { | Descriptor |
|---|---|
|     } | |
|     if( dynamic_tile_boundary_flag ) | |
|         tile_boundary_change_cycle | u(v) |
|     } | |
| } | |

In Table 4, the "dynamic_tile_boundary_flag" syntax element indicates whether the tile boundary may change dynamically. For instance, if the "dynamic_tile_boundary_flag" syntax element is equal to 1, the tile boundary may change dynamically. If the "dynamic_tile_boundary_flag" syntax element is equal to 0, the tile boundary does not change dynamically. The "dynamic_tile_boundary_flag" syntax element may not be equal to 1 if the sum of the "num_tile_columns_minus1" and "num_tile_rows_minus1" syntax elements is not equal to 1. If the "dynamic_tile_boundary_flag" syntax element is not present, video decoder 30 may infer the "dynamic_tile_boundary_flag" syntax element to be equal to 0. The "dynamic_tile_boundary_flag" syntax element may be equal to 1 only if there are only two vertical tiles or two horizontal tiles.

Furthermore, the "tile_boundary_change_direction_flag" syntax element of Table 4 may specify a direction of movement of the tile boundary. For instance, if the "tile_boundary_change_direction_flag" syntax element is equal to 0 and the tile boundary is vertical, the tile boundary may move from left to right from one picture to the next. If the "tile_boundary_change_direction_flag" syntax element is equal to 1 and the tile boundary is horizontal, the tile boundary may move from right to left from one picture to the next. If the "tile_boundary_change_direction_flag" syntax element is equal to 0 and the tile boundary is horizontal, the tile boundary may move from top to bottom. If the "tile_boundary_change_direction_flag" syntax element is equal to 1 and the tile boundary is horizontal, the tile boundary may move from bottom to top.

The "tile_boundary_change_rate_minus1" syntax element of Table 4 may specify the number of tree block rows or columns the tile boundary moves from one picture to the next. For instance, if the tile boundary is vertical, the "tile_boundary_change_rate_minus1" syntax element may indicate the number of tree block columns that the tile boundary moves from one picture to the next. If the tile boundary is horizontal, the "tile_boundary_change_rate_minus1" syntax element may indicate the number of tree block rows that the tile boundary moves from one picture to the next. The number of rows or columns may be equal to the "tile_boundary_change_rate_minus1" syntax element plus 1. For instance, the value of the variable "TileBoundaryChangeRate" may be derived by adding 1 to the "tile_boundary_change_rate_minus1" syntax element. For ease of explanation, the "tile_boundary_change_rate_minus1" syntax element may be referred to as the rate syntax element.

Video decoder 30 may use the "tile_boundary_change_cycle" syntax element of Table 5 to derive the position of the tile boundary. For ease of explanation, the "tile_boundary_change_cycle" syntax element may be referred to as the cycle syntax element. The cycle syntax element may indicate a cycle associated with a picture in the sequence. If the tile boundary is vertical, the "tile_boundary_change_cycle" syntax element may be represented by a number of bits indicated by the following formula:

Ceil(Log 2(PicWidthInLcus÷ TileBoundaryChange Rate+1))

In the formula above, Ceil( . . . ) is the ceiling function, Log 2( . . . ) is the log base 2 function, and "PicWidthInLcus" is the width of the picture in LCUs (i.e., tree blocks). Furthermore, if the tile boundary is vertical, the value of the "tile_boundary_change_cycle" syntax element may range from 0 to a value indicated by the following formula:

Ceil(PicWidthInLcus÷TileBoundaryChangeRate).

If the tile boundary is horizontal, the "tile_boundary_change_ cycle" element may be represented by a number of bits indicated by the following formula:

Ceil(Log 2(PicHeightInLcus÷Tile BoundaryChange Rate+1))

In the formula above, "PicHeightInLcus" is the height of the picture in LCUs (i.e., tree blocks). Furthermore, if the tile boundary is horizontal, the value of the "til_boundary_change_cycle" syntax element may range from 0 to a value indicated by the following formula:

Ceil(PicHeightInLcus÷TileBoundaryChangeRate).

If the tile boundary is vertical (i.e., the "num_tile_columns_minus1" syntax element is equal to 1), video decoder 30 may derive the position of the tile boundary as follows. If the "tile_boundary_change_direction_flag" syntax element is equal to 0, the width in tree blocks of the left tile is equal to "tile_boundary_change_ cycle"*"TileBoundaryChangeRate." The "TileBoundaryChangeRate" variable is equal to the "tile_boundary_change_rate_minus1" syntax element plus 1. Otherwise, if the "tile_boundary_change_direction_flag" syntax element is equal to 1, the width in tree blocks of the right tile is equal to "tile_boundary_change_cycle"*"TileBoundaryChangeRate".

If the tile boundary is horizontal (i.e., the "num_tile_rows_minus1" syntax element is equal to 1), video decoder 30 may derive the position of the tile boundary as follows. If the "tile_boundary_change_direction_flag" syntax element is equal to 0, the height in tree blocks of the upper tile is equal to "tile_boundary_change_cycle"*"TileBoundaryChangeRate." If the "tile_boundary_change_direction_flag" syntax element is equal to 1, the height in tree blocks of the lower tile is equal to "tile_boundary_change_cycle"*"TileBoundaryChangeRate."

In Table 5, the variable "IdrPicFlag" is specified as

IdrPicFlag=((nal_unit_type==5||nal_unit_type==6)?1: 0).

In other words, the variable "IdrPicFlag" has a value of 1 if the "nal_unit_type" syntax element of the NAL unit that contains the slice header has a value of 5 or 6.

In another example, Table 6 illustrates an example syntax of a picture parameter set RBSP. Together, the syntax elements of the PPS RBSP and the slice header of Table 5 may signal the movement and position of the tile boundary.

TABLE 6

| pic_parameter_set_rbsp( ) { | Descriptor |
|---|---|
|     pic_parameter_set_id | ue(v) |
|     seq_parameter_set_id | ue(v) |
|     entropy_coding_mode_flag | u(1) |
|     num_ref_idx_l0_default_active_minus1 | ue(v) |

TABLE 6-continued

| pic_parameter_set_rbsp( ) { | Descriptor |
|---|---|
|   num_ref_idx_l1_default_active_minus1 | ue(v) |
|   pic_init_qp_minus26/* relative to 26 */ | se(v) |
|   constrained_intra_pred_flag | u(1) |
|   tile_info_present_flag | u(1) |
|   if( tile_info_present_flag = = 1 ) { | |
|     num_tile_columns_minus1 | ue(v) |
|     num_tile_rows_minus1 | ue(v) |
|     if( num_tile_columns_minus1 != 0 \|\| num_tile_rows_minus1 != 0) { | |
|       tile_boundary_independence_idc | u(1) |
|       if( num_tile_columns_minus1 + num_tile_rows_minus1 = = 1 ) // one is equal to 0, and the other is equal to 1 | |
|         dynamic_tile_boundary_flag | u(1) |
|       if( dynamic_tile_boundary_flag ) { | |
|         tile_boundary_change_direction_flag | u(1) |
|         tile_boundary_change_rate_minus1 | ue(v) |
|       } | |
|       else { | |
|         uniform_spacing_idc | u(1) |
|         if( uniform_spacing_idc != 1 ) { | |
|           for( i=0; i<num_tile_columns_minus1 ; i++ ) | |
|             column_width [i] | ue(v) |
|           for( i=0; i <num_tile_rows_minus1; i++ ) | |
|             row_height [i] | ue(v) |
|         } | |
|       } | |
|     } | |
|   } | |
|   rbsp_trailing_bits( ) | |
| } | |

The "dynamic_tile_boundary_flag" syntax element, the "tile_boundary_change_direction_flag" syntax element, and the "tile_boundary_change_rate_minus1" syntax element of Table 6 may have the same semantics as the corresponding elements of Table 4. The other syntax elements of Tables 4, 5, and 6 may have the semantics defined in JCTVC document JCTVC-F335 mentioned above or in HEVC WD4. In some examples, video encoder 20 and video decoder 30 may use the syntax of Table 6 in addition to or as an alternative to the syntax of Table 4.

In this way, video encoder 20 may perform a method for encoding video data. The method for encoding video data may comprise partitioning each picture in a sequence of pictures into a pair of tiles, a tile boundary separating the pair of tiles. The encoding method may also comprise generating one or more syntax elements that indicate movement of the tile boundary from picture-to-picture within the sequence. Likewise, video decoder 30 may perform a method for decoding video data. The decoding method may comprise receiving one or more syntax elements in a bitstream of the video data, the one or more syntax elements indicating movement of a tile boundary from picture-to-picture within a sequence of pictures. The decoding method may also comprise determining, for each of the pictures, a position of the tile boundary based on the syntax elements.

Figure 3:
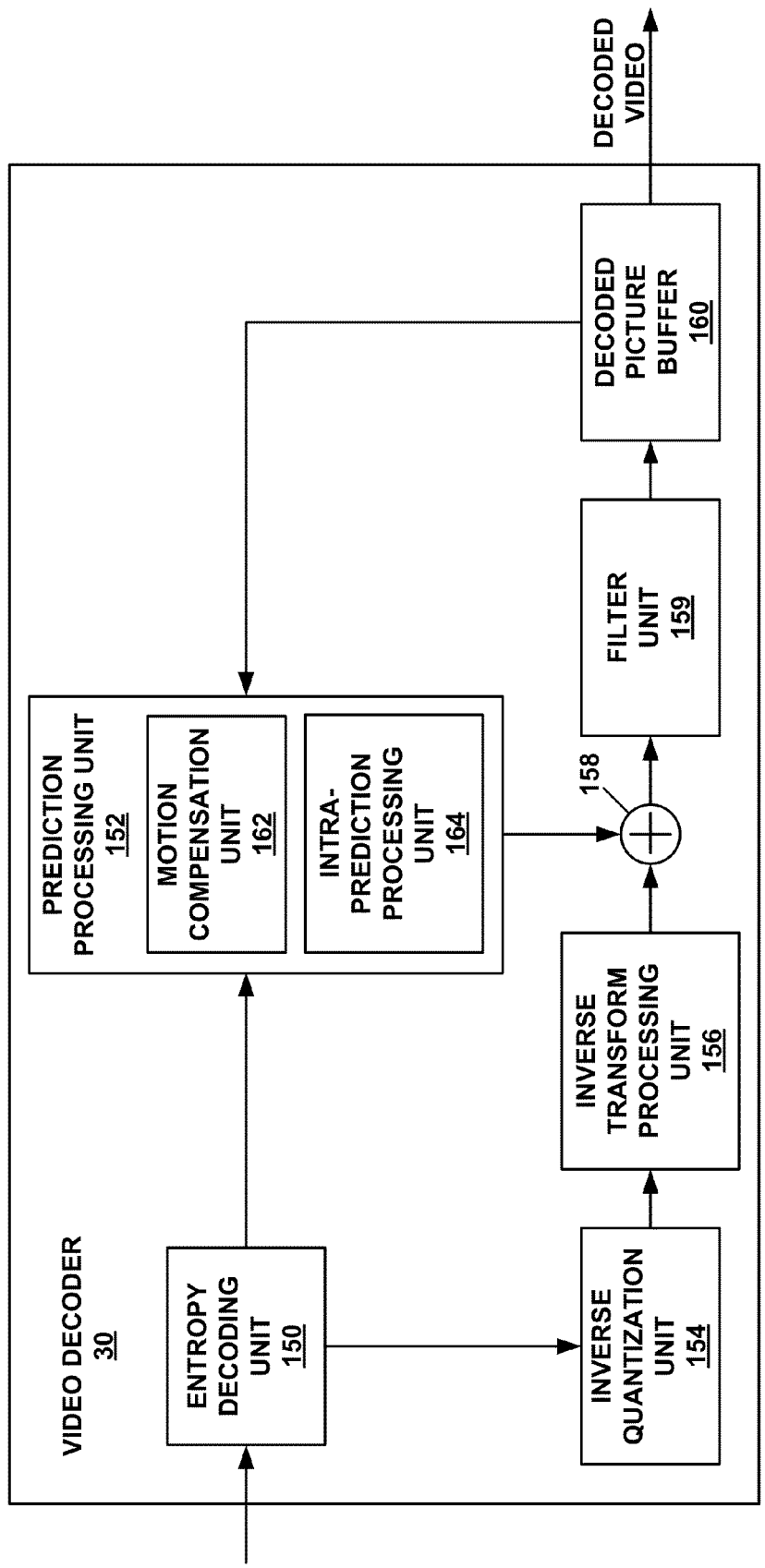
FIG. 3 is a block diagram illustrating an example video decoder that may implement the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream that comprises a plurality of syntax elements. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

The bitstream may comprise a series of NAL units. The NAL units of the bitstream may include SPS NAL units, PPS NAL units, SEI NAL units, and so on. As part of parsing the bitstream, entropy decoding unit 150 may extract and entropy decode SPSs from SPS NAL units, PSSs from PPS NAL units, SEI messages from SEI NAL units, and so on.

In addition, the NAL units of the bitstream may include coded slice NAL units. As part of parsing the bitstream, entropy decoding unit 150 may extract and entropy decode coded slices from the coded slice NAL units. Each of the coded slices may include a slice header and slice data. The slice header may contain syntax elements pertaining to a slice. The syntax elements in the slice header may include a syntax element that identifies a PPS associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may extract syntax elements from coded CUs in the slice data. The extracted syntax elements may include syntax elements associated with coefficient blocks. Entropy decoding unit 150 may perform CABAC decoding operations on some of the syntax elements.

As part of performing CABAC decoding on a syntax element, entropy decoding unit 150 may identify a coding context. Entropy decoding unit 150 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, entropy decoding unit 150 may decode a bin having the value associated with the lower sub-interval. If the encoded value is within the upper sub-interval, entropy decoding unit 150 may decode a bin having the value associated with the upper sub-interval. To decode a next bin of the syntax element, entropy decoding unit 150 may repeat these steps with the interval being the sub-interval that contains the encoded value. When entropy decoding unit 150 repeats these steps for the next bin, entropy decoding unit 150 may use modified probabilities based on the probabilities indicated by the identified coding context and the decoded bins. Entropy decoding unit 150 may de-binarize the bins to recover the syntax element.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual pixel block associated with the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded in skip mode or motion information of the PU is encoded using merge mode, motion compensation unit 162 may generate a merge candidate list for the PU. Motion compensation unit 162 may identify a selected merge candidate in the merge candidate list. Motion compensation unit 162 may generate a predictive sample blocks for the PU based on the one or more reference blocks associated with the motion information indicated by the selected merge candidate.

If motion information of a PU is encoded using AMVP mode, motion compensation unit 162 may generate a list 0 MV predictor candidate list and/or a list 1 MV predictor candidate list. Motion compensation unit 162 may determine a selected list 0 MV predictor candidate and/or a selected list 1 MV predictor candidate. Next, motion compensation unit 162 may determine a list 0 motion vector for the PU and/or a list 1 motion vector for the PU based on a list 0 motion vector difference (MVD), a list 1 MVD, a list 0 motion vector specified by the selected list 0 MV predictor candidate, and/or a list 1 motion vector specified by the selected list 1 MV predictor candidate. Motion compensation unit 162 may generate predictive sample blocks for the PU based on reference blocks associated with the list 0 motion vector and a list 0 reference picture index and/or a list 1 motion vector and a list 1 reference picture index.

In some examples, motion compensation unit 162 may refine the predictive sample blocks of a PU by performing interpolation based on interpolation filters. Identifiers for interpolation filters to be used for motion compensation with sub-pixel precision may be included in the syntax elements. Motion compensation unit 162 may use the same interpolation filters used by video encoder 20 during generation of the predictive sample blocks of the PU to calculate interpolated values for sub-integer samples of a reference block. Motion compensation unit 162 may determine the interpolation filters used by video encoder 20 according to received syntax information and use the interpolation filters to produce the predictive sample blocks.

If a PU is encoded using intra prediction, intra-prediction processing unit 164 may perform intra prediction to generate a predictive sample blocks for the PU. For example, intra-prediction processing unit 164 may determine an intra prediction mode for the PU based on syntax elements in the bitstream. Intra-prediction processing unit 164 may use the intra prediction mode to generate predictive data (e.g., predictive samples) for the PU based on the sample blocks of spatially neighboring PUs.

Reconstruction unit 158 may use the residual sample blocks associated with TUs of a CU and the predictive sample blocks of the PUs of the CU, i.e., either intra-prediction data or inter-prediction data, as applicable, to reconstruct the sample blocks of the CU. In particular, reconstruction unit 158 may add samples of the residual sample blocks to corresponding samples of the predictive sample blocks to reconstruct the sample blocks of the CU.

Filter unit 159 may perform a deblocking operation to reduce blocking artifacts associated with the CU. Video decoder 30 may store the sample blocks of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the sample blocks in decoded picture buffer 160, intra prediction or inter prediction operations on PUs of other CUs.

Figure 4:
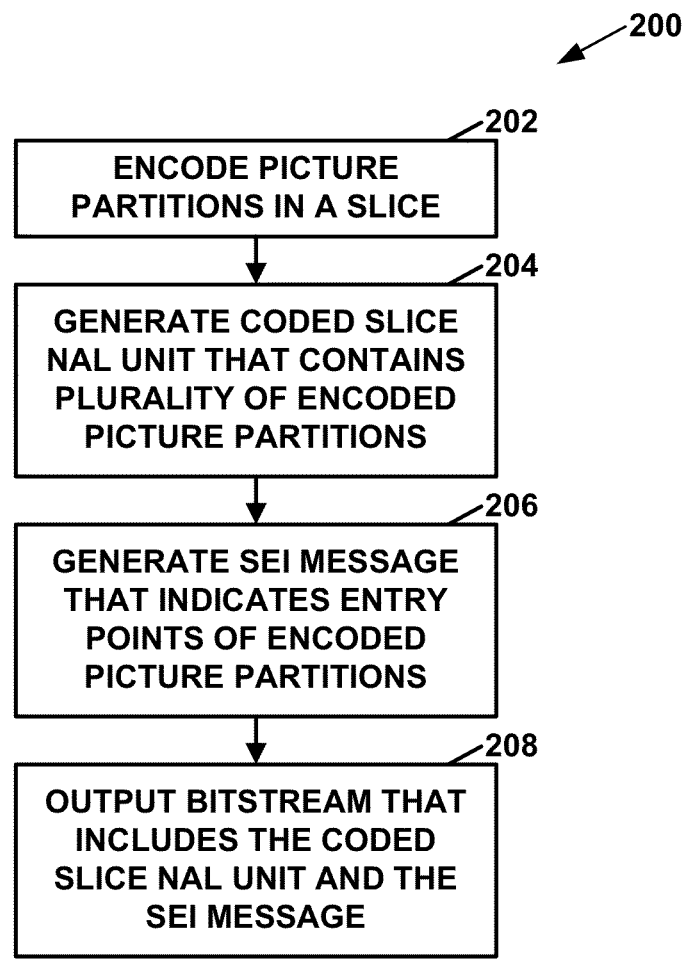
FIG. 4 is a flowchart that illustrates an example operation of a video encoder, in accordance with one or more techniques of this disclosure.

FIG. 4 is a flowchart that illustrates an example operation 200 of video encoder 20, in accordance with one or more techniques of this disclosure. In the example of FIG. 4, video encoder 20 may encode picture partitions (e.g., tiles, waves, entropy slices, etc.) of a slice of video data (202). The slice may include multiple coding units. By encoding a picture partition, video encoder 20 generates an encoded picture partition. Video encoder 20 may generate a coded slice NAL unit that includes the encoded picture partitions of the slice (204).

In addition, video encoder 20 may generate an SEI message that indicates the entry points of the coded picture partitions (206). That is, the SEI message may indicate the positions in the coded slice NAL unit of the coded picture partitions. The SEI message may have the format described above. For instance, video encoder 20 may generate a SEI NAL unit that includes the SEI message.

Video encoder 20 may output a bitstream that includes the coded slice NAL unit and the SEI message (208). The bitstream includes an encoded representation of video data. Video encoder 20 may output the bitstream in various ways. For example, video encoder 20 may transmit the bitstream on a communications network, such as the Internet. In another example, video encoder 20 may output the bitstream to a computer-readable storage medium, such as a hard disk drive or memory.

Figure 5:
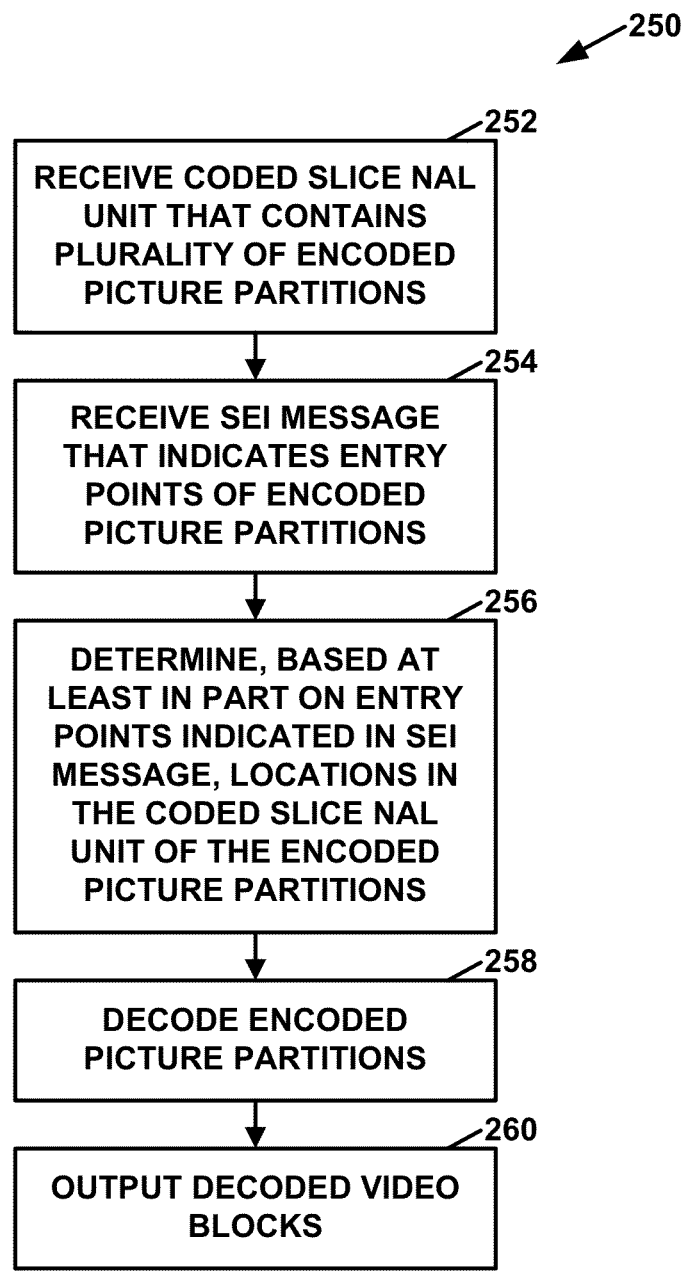
FIG. 5 is a flowchart that illustrates an example operation of a video decoder, in accordance with one or more techniques of this disclosure.

FIG. 5 is a flowchart that illustrates an example operation 250 of video decoder 30, in accordance with one or more techniques of this disclosure. In the example of FIG. 5, video decoder 30 may receive a coded slice NAL unit that contains a plurality of encoded picture partitions (252). In addition, video decoder 30 may receive an SEI message, e.g., in a non-VCL NAL unit, that indicates entry points of the encoded picture partitions in the coded slice NAL unit (254). Video decoder 30 may receive the coded slice NAL unit and the SEI message in various ways. For example, video decoder 30 may receive the coded slice NAL unit and the SEI message from a remote server via a communications network, such as the Internet. In another example, video decoder 30 may receive the coded slice NAL unit and the SEI message from a computer-readable storage medium, such as a hard disk drive or memory.

Video decoder 30 may determine, based at least in part on the entry points indicated in the SEI message, locations in the coded slice NAL unit of the encoded picture partitions (256). For example, the SEI message may indicate that a particular encoded picture partitions starts at the $256^{th}$ byte of the slice data of the coded slice NAL unit. Video decoder 30 may decode the encoded picture partitions (258). In some examples, video decoder 30 may decode two or more of the encoded picture partitions in parallel.

Video decoder 30 may output the decoded pixel blocks of the encoded picture partitions (260). In some examples, video decoder 30 outputs the decoded pixel blocks for display at display device 32. In another example, video decoder 30 may output the decoded pixel blocks to a video encoder. In this example, the video encoder may re-encode the decoded pixel blocks as part of a video transcoding operation.

Figure 6:
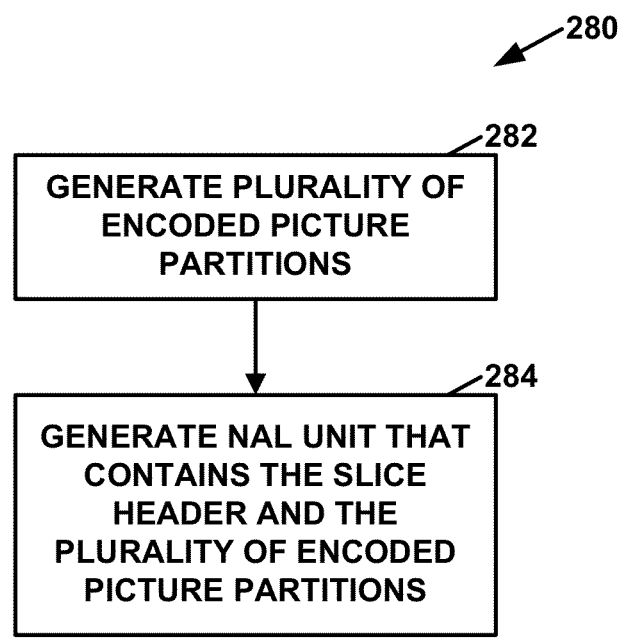
FIG. 6 is a flowchart that illustrates an example operation of the video encoder for generating a coded slice NAL unit that has a byte-aligned slice header, in accordance one or more techniques of this disclosure.

FIG. 6 is a flowchart that illustrates an example operation 280 of video encoder 20 for generating a coded slice NAL unit that has a byte-aligned slice header, in accordance one or more techniques of this disclosure. In the example of FIG. 6, video encoder 20 may generate a plurality of encoded picture partitions (282). Each of the encoded picture partitions is associated with a different set of CUs in a picture in the video data. Furthermore, video encoder 20 may generate a NAL unit that contains a slice header and the plurality of encoded picture partitions (284). The slice header may include one or more padding bits that align the slice header to a byte boundary.

Figure 7:
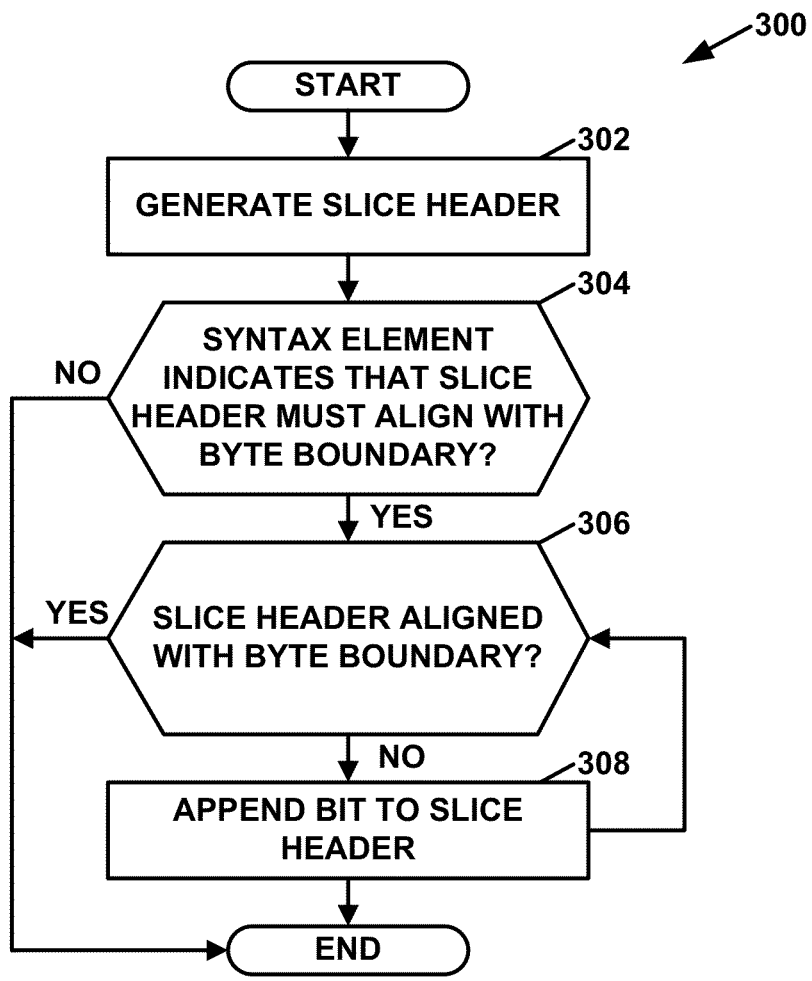
FIG. 7 is a flowchart that illustrates an example operation of the video encoder to generate a byte-aligned slice header, in accordance with one or more techniques of this disclosure.

FIG. 7 is a flowchart that illustrates an example operation 300 of video encoder 20 to generate a byte-aligned slice header, in accordance with one or more techniques of this disclosure. In the example of FIG. 7, video encoder 20 may generate a slice header (302). In addition, video encoder 20 may determine whether a syntax element in a parameter set (e.g., a sequence parameter set, a picture parameter set, an adaptation parameter set, etc.) indicates that the slice header must align with a byte boundary (304).

If the syntax element indicates that the slice header must align with a byte boundary ("YES" of 304), video encoder 20 may determine whether the slice header is aligned with a byte boundary (306). If the slice header is not aligned with a byte boundary ("NO" of 306), video encoder 20 may append a bit to the slice header (308). After appending the bit to the slice header, video encoder 20 may determine again whether the slice header is aligned with a byte boundary (306). In this way, video encoder 20 may continue appending bits to the slice header until the slice header is byte aligned.

If the slice header is aligned with a byte boundary ("YES" of 306) or if the syntax element indicates that the slice header does not need to align with a byte boundary ("NO" of 304), operation 300 is complete.

Figure 8:
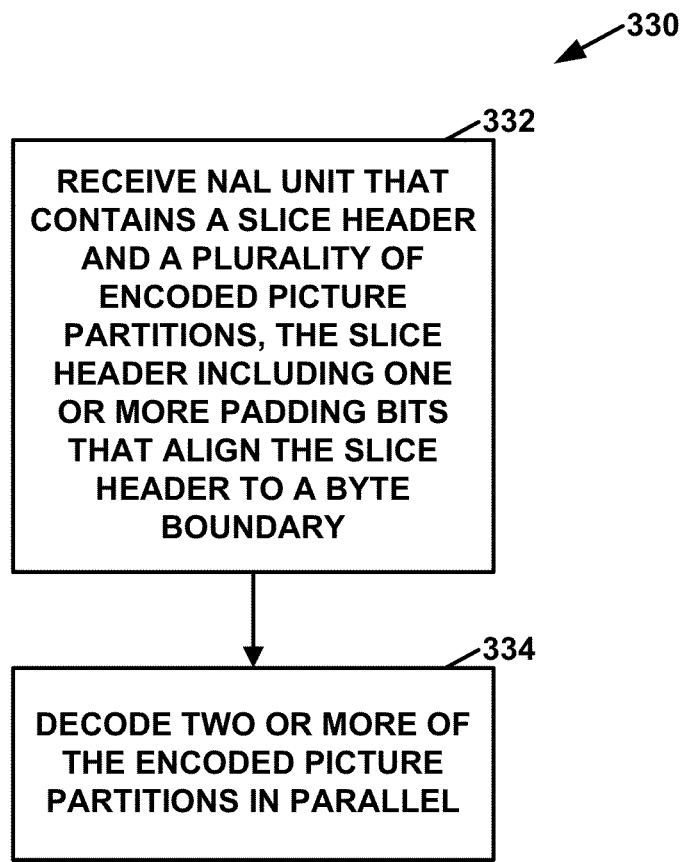
FIG. 8 is a flowchart that illustrates an example operation of the video decoder in which the video decoder receives a coded slice NAL unit that has a byte-aligned slice header, in accordance with one or more techniques of this disclosure.

FIG. 8 is a flowchart that illustrates an example operation 330 of video decoder 30 in which video decoder 30 receives a coded slice NAL unit that has a byte-aligned slice header, in accordance with one or more techniques of this disclosure. In the example of FIG. 8, video decoder 30 may receive a NAL unit (332). The NAL unit may contain a slice header and a plurality of encoded picture partitions of the video data. The slice header may include one or more padding bits that align the slice header to a byte boundary. Video decoder 30 may decode two or more of the encoded picture partitions in parallel (334).

Figure 9:
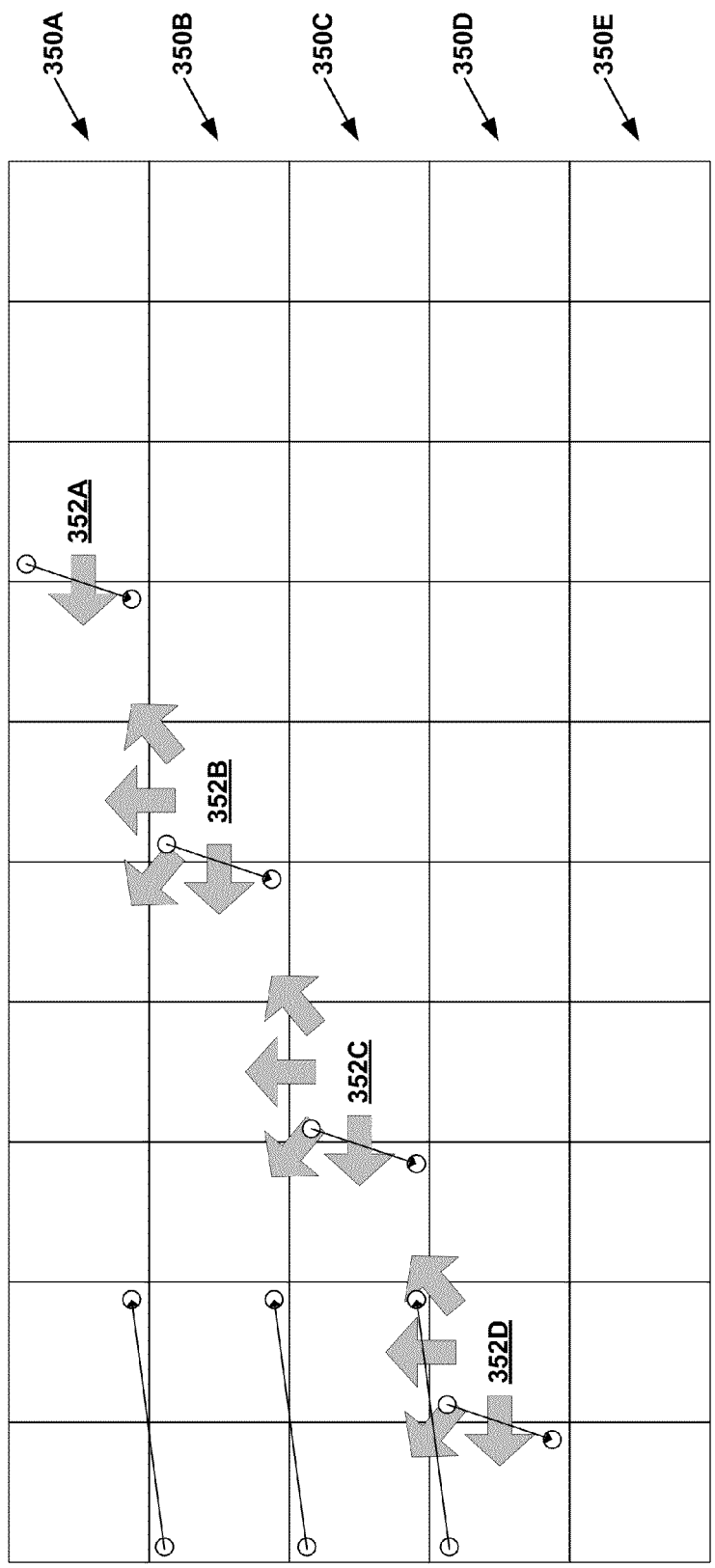
FIG. 9 is a conceptual diagram that illustrates wavefront parallel processing.

FIG. 9 is a conceptual diagram that illustrates wavefront parallel processing. As described above, a picture may be partitioned into pixel blocks, each of which is associated a tree block. FIG. 9 illustrates the pixel blocks associated with the tree blocks as a grid of white squares. The picture includes tree block rows 350A-350E (collectively, "tree block rows 350").

A first thread may be coding tree blocks in tree block row 350A. Concurrently, other threads may be coding tree blocks in tree block rows 350B, 350C, and 350D. In the example of FIG. 9, the first thread is currently coding a tree block 352A, a second thread is currently coding a tree block 352B, a third thread is currently coding a tree block 352C, and a fourth thread is currently coding a tree block 352D. This disclosure may refer to tree blocks 352A, 352B, 352C, and 352D collectively as "current tree blocks 352." Because the video coder may begin coding a tree block row after more than two tree blocks of an immediately higher row have been coded, current tree blocks 352 are horizontally displaced from each other by the widths of two tree blocks.

In the example of FIG. 9, the threads may use data from tree blocks indicated by the thick gray arrows to perform intra prediction or inter prediction for CUs in current tree blocks 352. The threads may also use data from one or more reference frames to perform inter prediction for CUs. To code a given tree block, a thread may select one or more CABAC contexts based on information associated with previously coded tree blocks. The thread may use the one or more CABAC contexts to perform CABAC coding on syntax elements associated with the first CU of the given tree block. If the given tree block is not the leftmost tree block of a row, the thread may select the one or more CABAC contexts based on information associated with a last CU of the tree block to the left of the given tree block. If the given tree block is the leftmost tree block of a row, the thread may select the one or more CABAC contexts based on information associated with a last CU of a tree block that is above and two tree blocks right of the given tree block. The threads may use data from the last CUs of the tree blocks indicated by the thin black arrows to select CABAC contexts for the first CUs of current tree blocks 352.

FIG. 10 is a conceptual diagram that illustrates an example tree block coding order for a picture 400 that is partitioned into multiple tiles 402A, 402B, 402C, 402D, 402E, and 402F (collectively, "tiles 402"). Each square block in picture 400 represents a pixel block associated with a tree block. The thick dashed lines indicate example tile boundaries. Different types of cross-hatching correspond to different slices.

The numbers in the pixel blocks indicate positions of the corresponding tree blocks (LCUs) in a tile coding order for picture 400. As illustrated in the example of FIG. 10, tree blocks in tile 402A are coded first, followed by tree blocks in tile 402B, followed by tree blocks in tile 402C, followed by tree blocks in tile 402D, followed by tree blocks in tile 402E, followed by tree blocks in tile 402F. Within each of tiles 402, the tree blocks are coded according to a raster scan order.

A video encoder may generate four coded slice NAL units for picture 400. The first coded slice NAL unit may include encoded representations of tree blocks 1-18. The slice data of the first coded slice NAL unit may include two encoded picture partitions. The first encoded picture partition may include the encoded representations of tree blocks 1-9. The second encoded picture partition may include the encoded representations of tree blocks 10-18. Thus, the first coded slice NAL unit may include an encoded representation of a slice that contains multiple tiles.

A second coded slice NAL unit may include encoded representations of tree blocks 19-22. The slice data of the second coded slice NAL unit may include a single encoded picture partition. A third coded slice NAL unit may include encoded representations of tree blocks 23-27. The slice data of the third coded slice NAL unit may include only a single encoded picture partition. Thus, tile 402C may contain multiple slices. A fourth coded slice NAL unit may include encoded representations of tree blocks 28-45. The slice data of the fourth coded slice NAL unit may include three encoded picture partitions, one each for tiles 402D, 402E, and 402F. Thus, the fourth coded slice NAL unit may include an encoded representation of a slice that contains multiple tiles.

Figure 11:
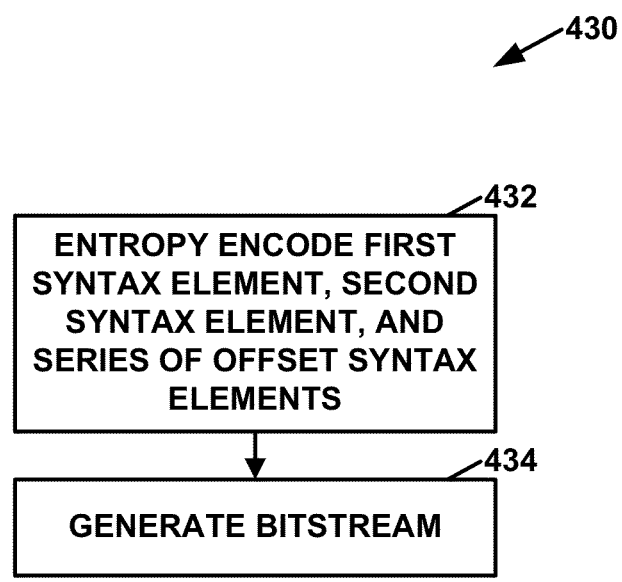
FIG. 11 is a flowchart that illustrates an example operation of the video encoder to generate a bitstream that includes variable-length values that represent syntax elements associated with offsets of encoded picture partitions within a NAL unit, in accordance with one or more aspects of this disclosure.

FIG. 11 is a flowchart that illustrates an example operation 430 of video encoder 20 to generate a bitstream that includes variable-length values that represent syntax elements associated with offsets of encoded picture partitions within a NAL unit, in accordance with one or more aspects of this disclosure. In the example of FIG. 11, video encoder 20 may entropy encode a first syntax element, a second syntax element, and a series of offset syntax elements (432). Lengths of each of the offset syntax elements are determinable based on the first syntax element. The number of offset syntax elements in the series of offset syntax elements is determinable based on the second syntax element. Locations of a plurality of encoded picture partitions within a NAL unit are determinable based on the offset syntax elements. Video encoder 20 may generate a bitstream that includes a variable-length value that represents the entropy-encoded first syntax element, a variable-length value that represents the entropy-encoded second syntax element, and fixed-length values that represent the offset syntax elements (434).

Figure 12:
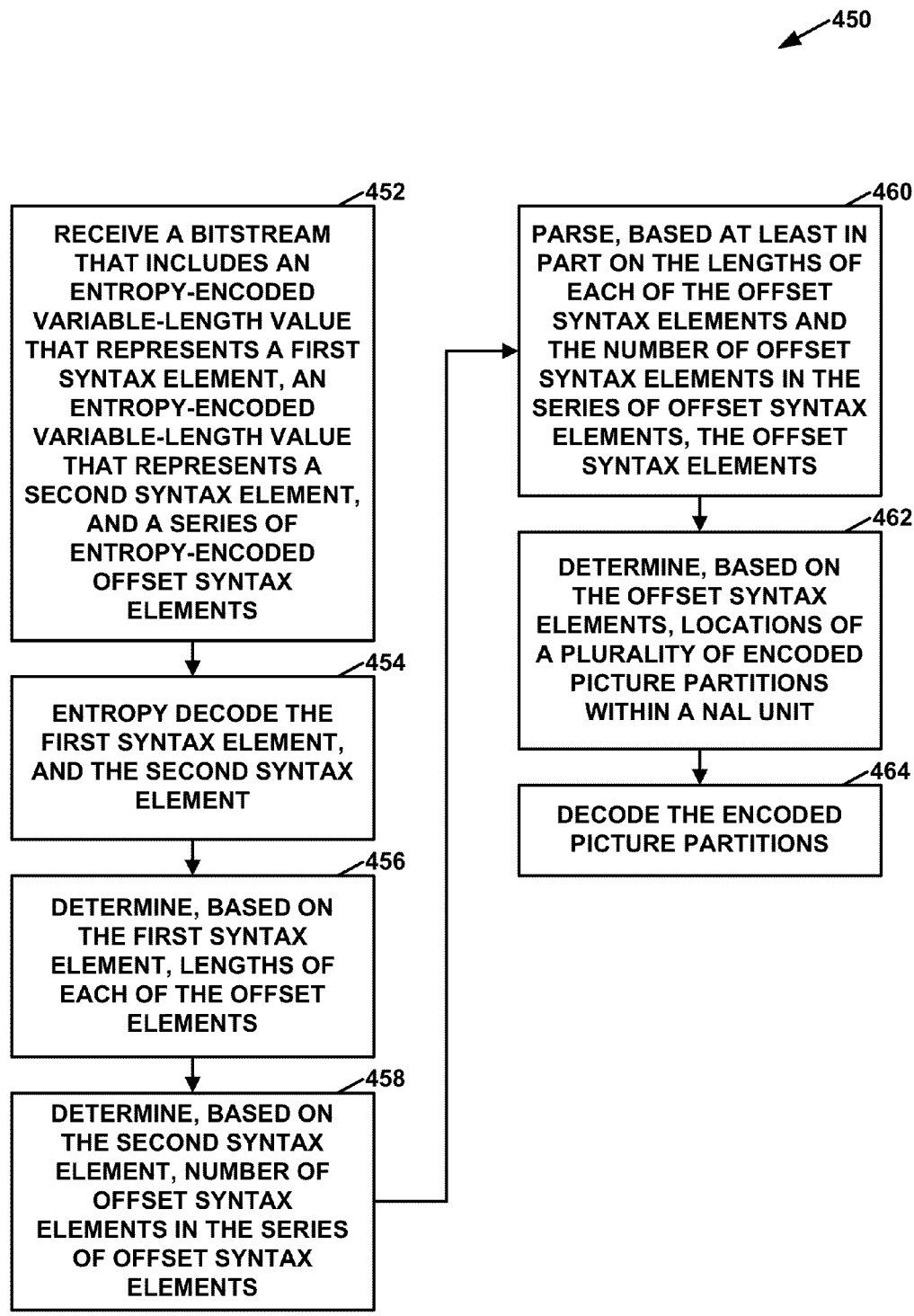
FIG. 12 is a flowchart that illustrates an example operation of the video decoder to decode video data represented by a bitstream that includes variable-length values that represent syntax elements associated with offsets of encoded picture partitions within a NAL unit, in accordance with one or more aspects of this disclosure.

FIG. 12 is a flowchart that illustrates an example operation 450 of the video decoder to decode video data represented by a bitstream that includes variable-length values that represent syntax elements associated with offsets of encoded picture partitions in a NAL unit, in accordance with one or more aspects of this disclosure. In the example of FIG. 12, video decoder 30 receives a bitstream that includes an entropy-encoded variable-length value that represents a first syntax element, an entropy-encoded variable-length value that represents a second syntax element, and a series of offset syntax elements (452). In addition, video decoder 30 may entropy decode the first syntax element and the second syntax element (454). Video decoder 30 may determine, based on the first syntax element, lengths of each of the offset syntax elements (456). Video decoder 30 may determine, based on the second syntax element, the number of offset syntax elements in the series of offset syntax elements (458).

In addition, video decoder 30 may parse, based at least in part on the lengths of each of the offset syntax elements and the number of offset syntax elements in the series of offset syntax elements, the offset syntax elements (460). In some examples, when video decoder 30 parses the offset syntax elements, video decoder 30 performs fixed-length decoding for each of the offset syntax elements. Fixed-length decoding may also be referred to as a special mode of entropy decoding. Similarly, fixed-length encoding may also be referred to as a special mode of entropy encoding.

Video decoder 30 may determine, based on the offset syntax elements, locations of a plurality of encoded picture partitions within a NAL unit (462). In some examples, a slice header of the NAL unit includes the first syntax element, the second syntax element, and the series of offset syntax elements. In other examples, a SEI message includes the first syntax element, the second syntax element, and the series of offset syntax elements. Furthermore, video decoder 30 may decode the encoded picture partitions (464).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   entropy encoding a first syntax element and a second syntax element;
   generating a series of offset syntax elements, wherein lengths of each of the offset syntax elements are determinable based on the first syntax element, the number of offset syntax elements in the series of offset syntax elements is determinable based on the second syntax element, and locations of a plurality of encoded picture partitions within a NAL unit are determinable based on the offset syntax elements, wherein each respective one of the encoded picture partitions includes a respective group of coded tree blocks within the NAL unit that are associated with a respective entropy slice, tile, or wavefront parallel processing (WPP) wave; and
   generating a bitstream forming a coded representation of the video data, the bitstream including a variable-length value that represents the entropy-encoded first syntax element, a variable-length value that represents the entropy-encoded second syntax element, and fixed-length values that represent the offset syntax elements.

2. The method of claim 1, wherein the series of offset syntax elements indicate byte offsets of the encoded picture partitions relative to preceding encoded picture partitions within the NAL unit.

3. The method of claim 1, further comprising generating a Supplemental Enhancement Information (SEI) message that includes the first syntax element, the second syntax element, and the series of offset syntax elements.

4. The method of claim 3, wherein the SEI message includes a syntax element that indicates that the SEI message belongs to a type of SEI messages that indicate entry points of encoded picture partitions in coded slice NAL units.

5. The method of claim 4, further comprising generating a SEI NAL unit that contains the SEI message.

6. The method of claim 1, wherein the lengths of each of the offset syntax elements are equal to a value of the first syntax element plus 10.

7. A computing device that comprises:
   a storage medium configured to store video data; and
   one or more processors configured to:
      entropy encode a first syntax element and a second syntax element;
      generating a series of offset syntax elements, wherein lengths of each of the offset syntax elements are determinable based on the first syntax element, the number of offset syntax elements in the series of offset syntax elements is determinable based on the second syntax element, and locations of a plurality of encoded picture partitions within a NAL unit are determinable based on the offset syntax elements, wherein each respective one of the encoded picture partitions includes a respective group of coded tree blocks within the NAL unit that are associated with a respective entropy slice, tile, or wavefront parallel processing (WPP) wave; and
      generate a bitstream forming a coded representation of the video data, the bitstream including a variable-length value that represents the entropy-encoded first syntax element, a variable-length value that represents the entropy-encoded second syntax element, and fixed-length values that represent the offset syntax elements.

8. The computing device of claim 7, wherein the series of offset syntax elements indicate byte offsets of the encoded picture partitions relative to preceding encoded picture partitions within the NAL unit.

9. The computing device of claim 7, wherein the one or more processors are configured to generate a Supplemental Enhancement Information (SEI) message that includes the first syntax element, the second syntax element, and the series of offset syntax elements.

10. The computing device of claim 9, wherein the SEI message includes a syntax element that indicates that the SEI message belongs to a type of SEI messages that indicate entry points of encoded picture partitions in coded slice NAL units.

11. The computing device of claim 7, further comprising generating a SEI NAL unit that contains the SEI message.

12. The computing device of claim 7, wherein the lengths of each of the offset syntax elements are equal to a value of the first syntax element plus 10.

13. The computing device of claim 7, wherein the computing device comprises a video encoder.

14. A computing device that comprises:
   means for entropy encoding a first syntax element and a second syntax element;
   means for generating a series of offset syntax elements, wherein lengths of each of the offset syntax elements are determinable based on the first syntax element, the number of offset syntax elements in the series of offset syntax elements is determinable based on the second syntax element, and locations of a plurality of encoded picture partitions within a NAL unit are determinable based on the offset syntax elements, wherein each respective one of the encoded picture partitions includes a respective group of coded tree blocks within the NAL unit that are associated with a respective entropy slice, tile, or wavefront parallel processing (WPP) wave; and
   means for generating a bitstream forming a coded representation of video data, the bitstream including a variable-length value that represents the entropy-encoded first syntax element, a variable-length value that represents the entropy-encoded second syntax element, and fixed-length values that represent the offset syntax elements.

15. A non-transitory computer-readable storage medium having instructions stored thereon that, when executed by one or more processors of a computing device, configure the computing device to:
   entropy encode a first syntax element and a second syntax element;

generate a series of offset syntax elements, wherein lengths of each of the offset syntax elements are determinable based on the first syntax element, the number of offset syntax elements in the series of offset syntax elements is determinable based on the second syntax element, and locations of a plurality of encoded picture partitions within a NAL unit are determinable based on the offset syntax elements, wherein each respective one of the encoded picture partitions includes a respective group of coded tree blocks within the NAL unit that are associated with a respective entropy slice, tile, or wavefront parallel processing (WPP) wave; and generate a bitstream forming a coded representation of video data, the bitstream including a variable-length value that represents the entropy-encoded first syntax element, a variable-length value that represents the entropy-encoded second syntax element, and fixed-length values that represent the offset syntax elements.

16. A method for decoding video data, the method comprising:

receiving a bitstream forming a coded representation of the video data, the bitstream including an entropy-encoded variable-length value that represents a first syntax element, an entropy-encoded variable-length value that represents a second syntax element, and a series of fixed-length offset syntax elements;

entropy decoding the first syntax element and the second syntax element;

determining, based on the first syntax element, lengths of each of the offset syntax elements;

determining, based on the second syntax element, the number of offset syntax elements in the series of offset syntax elements;

parsing, based at least in part on the lengths of each of the offset syntax elements and the number of offset syntax elements in the series of offset syntax elements, the offset syntax elements;

determining, based on the offset syntax elements, locations of a plurality of encoded picture partitions within a network abstraction layer (NAL) unit, wherein each respective one of the encoded picture partitions includes a respective group of coded tree blocks within the NAL unit that are associated with a respective entropy slice, tile, or wavefront parallel processing (WPP) wave; and decoding the encoded picture partitions.

17. The method of claim 16, wherein the series of offset syntax elements indicate byte offsets of the encoded picture partitions relative to preceding encoded picture partitions within the NAL unit.

18. The method of claim 16, wherein the bitstream includes a Supplemental Enhancement Information (SEI) message that includes the first syntax element, the second syntax element, and the series of offset syntax elements.

19. The method of claim 18, wherein the SEI message includes a syntax element that indicates that the SEI message belongs to a type of SEI messages that indicate entry points of encoded picture partitions in coded slice NAL units.

20. The method of claim 16, wherein the bitstream includes a SEI NAL unit that includes the SEI message.

21. The method of claim 20, wherein the SEI NAL unit immediately precedes in the bitstream the NAL unit that contains the plurality of encoded picture partitions; and wherein the method further comprises determining, based at least in part on the SEI NAL unit immediately preceding in the bitstream the NAL unit that contains the plurality of encoded picture partitions, that the SEI message is applicable to the NAL unit that contains the plurality of encoded picture partitions.

22. The method of claim 16, further comprising providing the encoded picture partitions to different processing cores for parallel decoding of the encoded picture partitions, and decoding the respective encoded picture partitions in the processing cores.

23. The method of claim 16, wherein the lengths of each of the offset syntax elements are equal to a value of the first syntax element plus 10.

24. A computing device that comprises:

a data storage medium configured to store video data; and one or more processors configured to:

receive a bitstream forming a coded representation of the video data, the bitstream including an entropy-encoded variable-length value that represents a first syntax element, an entropy-encoded variable-length value that represents a second syntax element, and a series of offset syntax elements;

entropy decode the first syntax element and the second syntax element;

determine, based on the first syntax element, lengths of each of the offset syntax elements;

determine, based on the second syntax element, the number of offset syntax elements in the series of offset syntax elements;

parse, based at least in part on the lengths of each of the offset syntax elements and the number of offset syntax elements in the series of offset syntax elements, the offset syntax elements;

determine, based on the offset syntax elements, locations of a plurality of encoded picture partitions within a network abstraction layer (NAL) unit, wherein each respective one of the encoded picture partitions includes a respective group of coded tree blocks within the NAL unit that are associated with a respective entropy slice, tile, or wavefront parallel processing (WPP) wave; and decode the encoded picture partitions.

25. The computing device of claim 24, wherein the series of offset syntax elements indicate byte offsets of the encoded picture partitions relative to preceding encoded picture partitions within the NAL unit.

26. The computing device of claim 24, wherein the bitstream includes a Supplemental Enhancement Information (SEI) message that includes the first syntax element, the second syntax element, and the series of offset syntax elements.

27. The computing device of claim 26, wherein the SEI message includes a syntax element that indicates that the SEI message belongs to a type of SEI messages that indicate entry points of encoded picture partitions in coded slice NAL units.

28. The computing device of claim 24, wherein the bitstream includes a SEI NAL unit that includes the SEI message.

29. The computing device of claim 28, wherein the SEI NAL unit immediately precedes in the bitstream the NAL unit that contains the plurality of encoded picture partitions; and wherein the one or more processors are configured to determine, based at least in part on the SEI NAL unit immediately preceding in the bitstream the NAL unit that contains the plurality of encoded picture partitions, that the SEI message is applicable to the NAL unit that contains the plurality of encoded picture partitions.

30. The computing device of claim 24, wherein the one or more processors are configured to provide the encoded picture partitions to different processing cores for parallel decoding of the encoded picture partitions.

31. The computing device of claim 24, wherein the computing device comprises a video decoder.

32. The computing device of claim 24, wherein a value of the first syntax element, plus 10, is equal to the length in bits of the series of offset syntax elements.

33. A computing device that comprises:
- means for receiving a bitstream forming a coded representation of video data, the bitstream including an entropy-encoded variable-length value that represents a first syntax element, an entropy-encoded variable-length value that represents a second syntax element, and a series of offset syntax elements;
- means for entropy decoding the first syntax element and the second syntax element;
- means for determining, based on the first syntax element, lengths of each of the offset syntax elements;
- means for determining, based on the second syntax element, the number of offset syntax elements in the series of offset syntax elements;
- means for parsing, based at least in part on the lengths of each of the offset syntax elements and the number of offset syntax elements in the series of offset syntax elements, the offset syntax elements;
- means for determining, based on the offset syntax elements, locations of a plurality of encoded picture partitions within a network abstraction layer (NAL) unit, wherein each respective one of the encoded picture partitions includes a respective group of coded tree blocks within the NAL unit that are associated with a respective entropy slice, tile, or wavefront parallel processing (WPP) wave; and
- means for decoding the encoded picture partitions.

34. A non-transitory computer-readable storage medium having instructions stored thereon that, when executed by one or more processors of a computing device, configure the computing device to:
- receive a bitstream forming a coded representation of video data, the bitstream including an entropy-encoded variable-length value that represents a first syntax element, an entropy-encoded variable-length value that represents a second syntax element, and a series of offset syntax elements;
- entropy decode the first syntax element and the second syntax element;
- determine, based on the first syntax element, lengths of each of the offset syntax elements;
- determine, based on the second syntax element, the number of offset syntax elements in the series of offset syntax elements;
- parse, based at least in part on the lengths of each of the offset syntax elements and the number of offset syntax elements in the series of offset syntax elements, the offset syntax elements;
- determine, based on the offset syntax elements, locations of a plurality of encoded picture partitions within a network abstraction layer (NAL) unit, wherein each respective one of the encoded picture partitions includes a respective group of coded tree blocks within the NAL unit that are associated with a respective entropy slice, tile, or wavefront parallel processing (WPP) wave; and
- decode the encoded picture partitions.

* * * * *